(12) United States Patent
Caseley et al.

(10) Patent No.: US 12,542,501 B2
(45) Date of Patent: Feb. 3, 2026

(54) SYSTEM AND METHOD OF RAPIDLY REORIENTING A ROTATABLE ELEMENT

(71) Applicant: BAE SYSTEMS Information and Electronic Systems Integration Inc., Nashua, NH (US)

(72) Inventors: Clifford D. Caseley, Hudson, NH (US); David B. Jordan, Hollis, NH (US); James L. Kingston, Temple, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 181 days.

(21) Appl. No.: 18/438,610

(22) Filed: Feb. 12, 2024

(65) Prior Publication Data
US 2025/0260347 A1    Aug. 14, 2025

(51) Int. Cl.
*H02P 6/16* (2016.01)
*H02P 6/08* (2016.01)

(52) U.S. Cl.
CPC .   *H02P 6/16* (2013.01); *H02P 6/08* (2013.01)

(58) Field of Classification Search
CPC .................................... H02P 6/16; H02P 6/08
(Continued)

(56) References Cited

U.S. PATENT DOCUMENTS

| 5,760,944 A | 6/1998 | Minakuchi |
| 7,336,407 B1 | 2/2008 | Adams |
(Continued)

FOREIGN PATENT DOCUMENTS

| EP | 1256028 B1 | 11/2002 |
| EP | 1986032 A1 | 10/2008 |
(Continued)

OTHER PUBLICATIONS

Chongshang Sun, Yalin Ding, Dejiang Wang, and Dapeng Tian, "Backscanning step and stare imaging system with high frame rate and wide coverage," Appl. Opt. 54, 4960-4965 (2015) <DOI:10.1364/AO.54.004960>.
(Continued)

*Primary Examiner* — David Luo
(74) *Attorney, Agent, or Firm* — Maine Cernota & Curran

(57) ABSTRACT

An apparatus for causing a motor to rapidly reorient a rotatable element calculates a desired rotation rate $f(\theta_e)$ as a function of an orientation error $\theta_e$, and calculates a current $I_r$ that, if applied to the motor, will accelerate and then regulate the rotation rate $\dot\theta$ equal to $f(\theta_e)$. Simultaneously, a maximum current $I_s$ is calculated that will not exceed an applicable power limit $P_{max}$ or motor current limit. The lesser of $I_r$ and $I_s$ is applied to the motor. For large rotations, $I_s$ is applied during acceleration until $\dot\theta=f(\theta_e)$, and then $I_r$ is applied during deceleration. Multiple elements can be simultaneously rotated by apportioning $P_{max}$ among the elements as they are rotated. The allocated $P_{maxi}$ can be larger for elements that require larger rotations, and can be varied during the slew time. The rotatable element can be a gimbal pointer mirror or a Risley prism element.

20 Claims, 18 Drawing Sheets

(58) Field of Classification Search
USPC .......................................... 318/400.01, 700
See application file for complete search history.

(56) References Cited

U.S. PATENT DOCUMENTS

| | | | | |
|---|---|---|---|---|
| 8,796,979 | B2* | 8/2014 | Oh | ............................ H02P 6/16 318/400.14 |
| 11,002,956 | B1 | 5/2021 | Carlson | |
| 11,640,043 | B2 | 5/2023 | Lentz | |
| 2019/0331756 | A1 | 10/2019 | Jungwirth | |

FOREIGN PATENT DOCUMENTS

| | | |
|---|---|---|
| EP | 3859426 A1 | 8/2021 |
| GB | 2612356 A | 5/2023 |
| WO | 2004099849 A1 | 11/2004 |
| WO | 2022178575 A1 | 9/2022 |

OTHER PUBLICATIONS

Wang, Lin & Liu, Xuelian & Wang, Chunyang. (2019). Modeling and design of fast steering mirror in image motion compensation for backscanning step and stare imaging systems. Optical Engineering. 58. 1. <DOI:10.1117/1.OE.58.10.103105>.

Lavigne, V., & Ricard, B. (2005). Step-Stare Image Gathering for High-Resolution Targeting. In Advanced Sensory Payloads for UAV (pp. 17-1-17-14). Meeting Proceedings RTO-MP-SET-092, Paper 17. Neuilly-sur-seine, France: RTO.

Anhu Li, Wansong Sun, Xingsheng Liu, and Wei Gong, "Laser coarse-fine coupling tracking by cascaded rotation Risley-prism pairs," Appl. Opt. 57, 3873-3880 (2018) <DOI:10.1364/AO.57. 003873>.

* cited by examiner

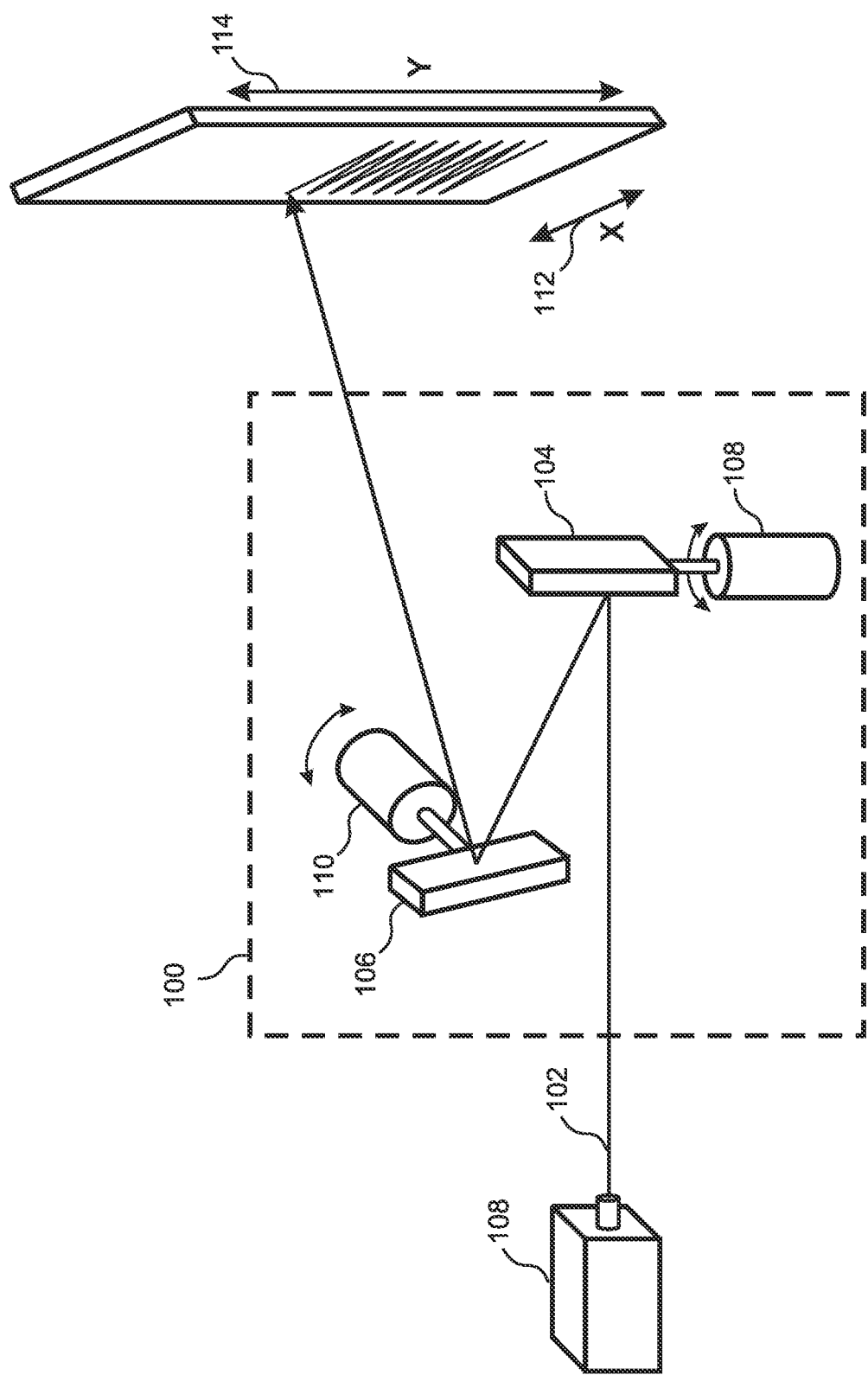

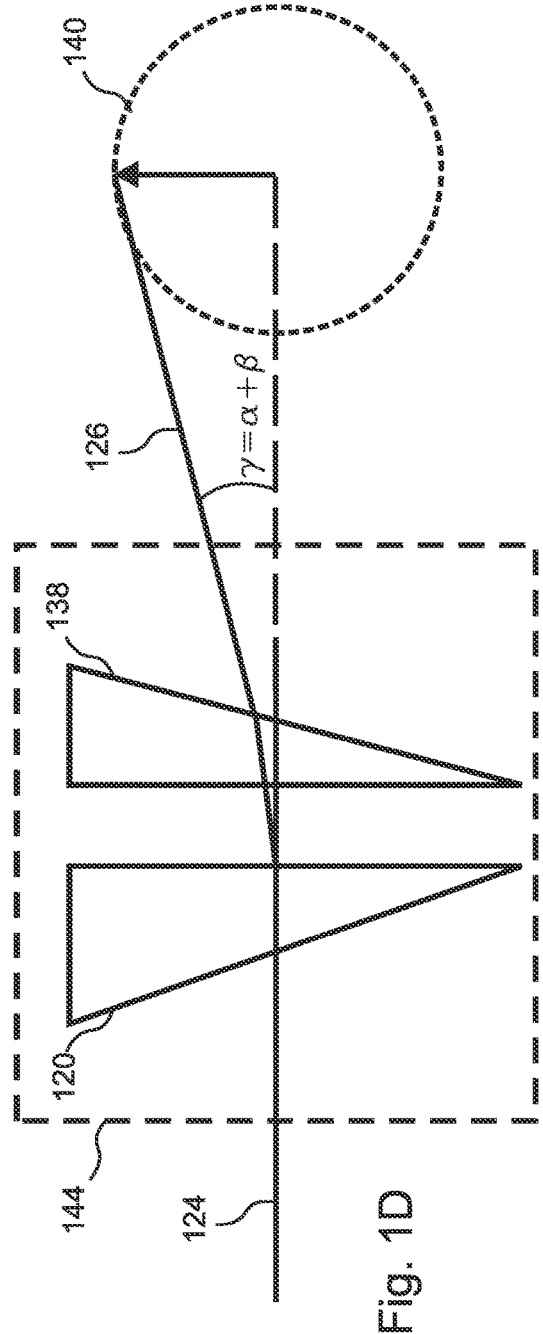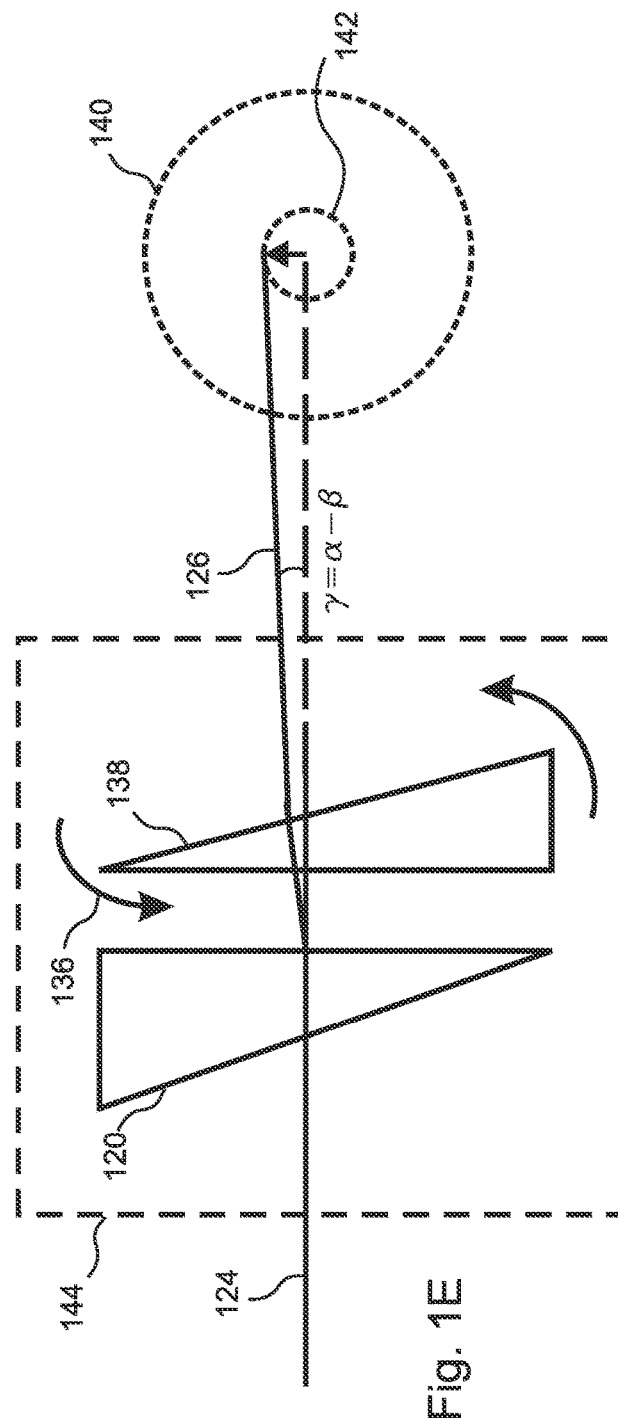

```
Deceleration Function  X | power_leveling_example_rt  X function rateCmd = fcn(posErr,Kp,phi)

% phi is the error angle where the function starts to be linear

% kp is the proportional gain when the function is linear

% Calculate the rate command sent to the rate loop
    rateCmd = posErr * ( sqrt( phi ) * Kp / sqrt( ( abs(posErr) + phi) ));

end
```

Fig. 9B

```
function Idec = fcn(Imax,Rm,Pmax)
    % Idec is maximum motor current for deceleration
    % Imax is motor current rating
    % Ipmax0 is the motor current limit based on allocated power
    %  calculated in stalled rotor condition (no EMF)

Ipmax0 = sqrt(Pmax/Rm);

Idec = min([Imax  Ipmax0]);
end
```

```
Deceleration Function  X    Saturation Current  X function Is = fcn(motor_volts,Idec,Pmax)

% motor_volts is the voltage now applied to the motor
    % Idec = min(Imax, Ipmax0)
        % Imax is motor rated current
        % Ipmax0 is the motor current that draws Pmax at zero speed
    % Pmax is the maximum power to be drawn from the power supply % Calculate current limit based on Pmax and motor voltage
    % (include miniscule number eps to avoid divide-by-zero error)

Ipmax = Pmax / ((abs(motor_volts) + eps));

% Calculate saturation current that limits motor current
    % based on motor current rating and maximum power to be
    % drawn from the power supply
    currLimit = min(Idec,Ipmax);

Is=currLimit;

end
```

Fig. 13B ical elements that are
rotatable by variable speed motors, and more particularly to
SYSTEM AND METHOD OF RAPIDLY REORIENTING A ROTATABLE ELEMENT

FIELD

The disclosure relates to devices having elements that are rotatable by variable speed motors, and more particularly to devices having elements that must be rotated rapidly from one fixed orientation to another.

BACKGROUND

Many systems include rotatable elements that are rotated by variable speed motors, such as brushless DC motors, where it is important to rotate the rotatable element or elements rapidly from one fixed orientation to another, typically without overshoot. This can be challenging if the rotatable elements have significant moments of inertia.

Implementation of quick rotations of rotatable elements can require powerful control motors, and can also require large current surges from a power source, even if the average power consumption is modest. This approach can be challenging for some environments, such as satellites and unmanned aerial vehicles. Accordingly, it can be vital to implement a control algorithm for rotatable elements that provides maximum transition speed (minimum "slew" time) while ensuring that maximum power and current limits of the power source and motors are not exceeded. If the system includes more than one rotatable element, it can be necessary to ensure that the total aggregate power consumed by all of the motors at any given time does not exceed a specified maximum.

What is needed, therefore, is an apparatus and method for rapidly reorienting rotatable elements that minimize slew time while ensuring that applicable power and current limits are not exceeded.

SUMMARY

The present disclosure is an apparatus and method for rapidly reorienting rotatable elements that minimize slew time while ensuring that applicable power and current limits are not exceeded.

A controller causes each of the rotatable elements to execute its required rotations according to a control method that comprises two modules, referred to herein as the "regulating" module and the "power limiting" module. During each rotation of a rotatable element by a corresponding variable speed motor, the power limiting module monitors the current that is drawn by the motor, and ensures that it never exceeds a maximum applicable motor current limit. At the same time, the power limiting module also calculates the power being drawn from the power source (referred to herein as the power supply), and ensures that it never exceeds a maximum applicable power draw limit.

For applications where rotation of multiple rotatable elements is required, embodiments of the present disclosure limit the total of the power that is drawn by the rotatable elements. For example, some of these embodiments assign more power to the rotatable element that requires the largest rotation, so that the slew time can be minimized. In embodiments, the controller estimates the slew times as a function of applied power for each of the rotatable elements, based on the required orientation changes, the motor torque constants and motor current limits, as well as the moments of inertia of the rotatable elements. The controller then allocates the maximum allowed power between the two rotatable elements, such that the net slew time for both of the rotatable elements is minimized, while the total power applied to the two rotatable elements never exceeds the specified maximum power.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1C illustrates pointing of a beam of light using a gimbal pointer;

FIG. 1D illustrates refraction of a beam of light by a pair of rotatable prisms included in a Risley prism assembly (RPA), with the prisms oriented to provide a maximum refraction of the light;

FIG. 1E illustrates refraction of a beam of light by a pair of rotatable prisms included in a Risley prism assembly (RPA), with the prisms oriented to provide minimum refraction of the light;

FIG. 9B is a slew and settle function of the model of FIG. 8;

FIG. 13B is a Saturation Current function of the model of FIG. 8

DETAILED DESCRIPTION

The present disclosure is an apparatus and method for rapidly reorienting rotatable elements that minimize slew time while ensuring that applicable power and current limits are not exceeded.

Figure 1A:
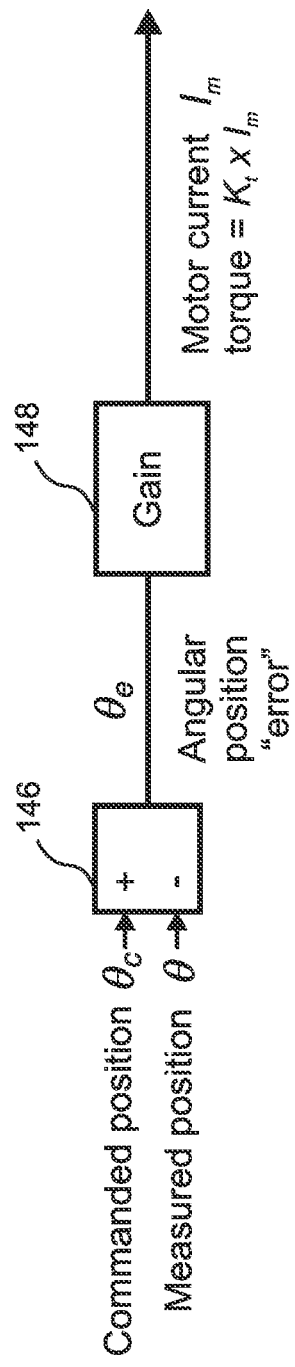
FIG. 1A illustrates a highly simplified control system applicable to rotatable elements in which a current is applied to a motor according to a difference at any given time between a measured angular orientation and a "commanded" orientation.

A highly simplified control system applicable to rotatable elements is illustrated in FIG. 1A. In this simplified version, the system merely compares 146 a measured angular orientation of the rotatable element (actual position $\theta$) with the "commanded" orientation $\theta_c$, where $\theta_c$ is the required orientation to which the rotatable element is being rotated. At any given time, the difference between these two orientations $\theta_c - \theta = \theta_e$ is considered a position "error," which is multiplied by some gain 148 and converted to a motor current $I_m$ to be applied to the motor, resulting in a motor torque that is proportional to $I_m$.

In general, depending on the apparatus, at any given time the angular position and/or rotation rate of each of the rotatable elements can be estimated according to the commands that have been sent to the motors by a controller, and/or directly measured by one or more sensors.

Of course, this simple approach would result in significant overshoot past the desired orientation $\theta_c$, and would fail to ensure that specified currents and power levels were not exceeded.

Figure 1B:
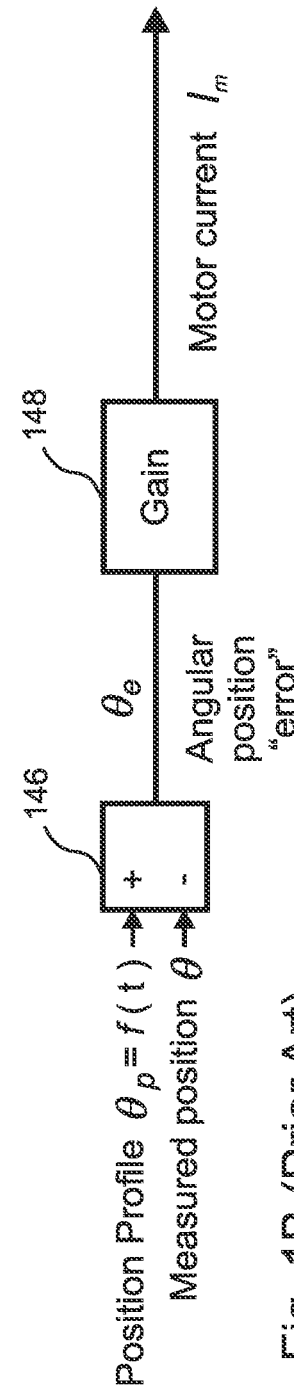
FIG. 1B illustrates a highly simplified control system applicable to rotatable elements in which current is applied to a motor according to a difference at any given time between an actual orientation and a pre-calculated position "profile"

Instead, with reference to FIG. 1B, one approach is to provide a pre-calculated position "profile" $f(t)$, and to apply a current to the motor that is proportional to the difference 146 at any given time between the actual orientation $\theta$ and the profile value $f(t)$. The position profile $f(t)$ is typically based on minimal slew duration, power constraint, friction, load inertia, and parameter uncertainty due to tolerances, aging, temperature, and environment. Therefore, margins must be applied to the position profile $f(t)$ to ensure that it can be followed faithfully without exceeding a limit on available torque. There must also be a margin to ensure that the maximum power drawn by the motor does not exceed the allowed value. This need for generous margins reduces the achieved acceleration, resulting in longer slew times.

Embodiments of the present disclosure described herein with reference to optical pointing systems that direct light from a selected location or region within a field of interest (FOI) to a "target" that is within the optical system, or vice-versa, where the terms "pointer" and "pointing system" are used herein interchangeably. However, it will be understood that the present disclosure applies to any system that includes at least one variable speed motor that controls the orientation of a corresponding rotatable element.

With reference to FIG. 1C, one common type of pointer that is implemented in many optical systems is a "gimbal" pointer 100, which directs light 102 using a pair of rotatable reflective mirrors 104, 106 driven by variable speed servomotors 108, 110. Typically, the "X" 112 and "Y" 114 components of the angular light displacement are separately and independently controlled by the two mirrors 104, 106.

With reference to FIGS. 1D and 1E, another approach is to implement a Risley pointer, which does not redirect light by reflecting it, but instead refracts the light by passing it through a "Risley" prism assembly (RPA) 144, which comprises a pair of rotatable wedge prisms. An RPA 144 combines at least two prisms 120, 138 that are independently rotatable 136 about a common axis 124. In FIG. 1B, the two prisms 120, 138 are aligned (zero degrees relative rotation $\Delta\theta$) such that the deflection by the two prisms 120, 138 of a beam directed along the common axis 124 is cumulative, such that the total deflection angle $\gamma$ is the sum of their separate refraction angles, i.e. $\gamma = \alpha + \beta$. In FIG. 1C the second prism 138 has been rotated such that the deflection of the beam by the two prisms 120, 138 is subtractive ($\Delta\theta = 180$ degrees), such that the total deflection angle $\gamma$ is the difference between their separate refraction angles, i.e. $\gamma = \alpha - \beta$. If the two prisms 120, 138 have the same dispersion angle a, the output beam 126 can be directed to a target anywhere within the disk defined by the maximum deflection circle 140. It will be noted that the pointing circles 140, 142 in FIGS. 1B-1C are presented as if the light were directed into the page, while other elements in the drawings are presented with the light traveling in the plane of the page. In some applications, the individual prisms are replaced by clusters of two more prisms which rotate as a unit. For this reason, the present application sometimes refers to the rotatable elements of an RPA 144 as the "prism elements."

Pointing systems are sometimes required to perform rapid changes in pointing direction. For example, a pointing system might be required to execute "step-and-stare" (SAS) pointing functions, referred to herein as "step-scanning," wherein the pointing direction is varied in a "stepwise" manner, i.e. shifted suddenly between a series of proximate locations along a scanning path, and held stationary in each of these locations until being transitioned to the next one. This can be problematic if very rapid transitions between "steps" are required, and the gimbal mirrors or RPA prism elements are large and heavy.

Figure 2:
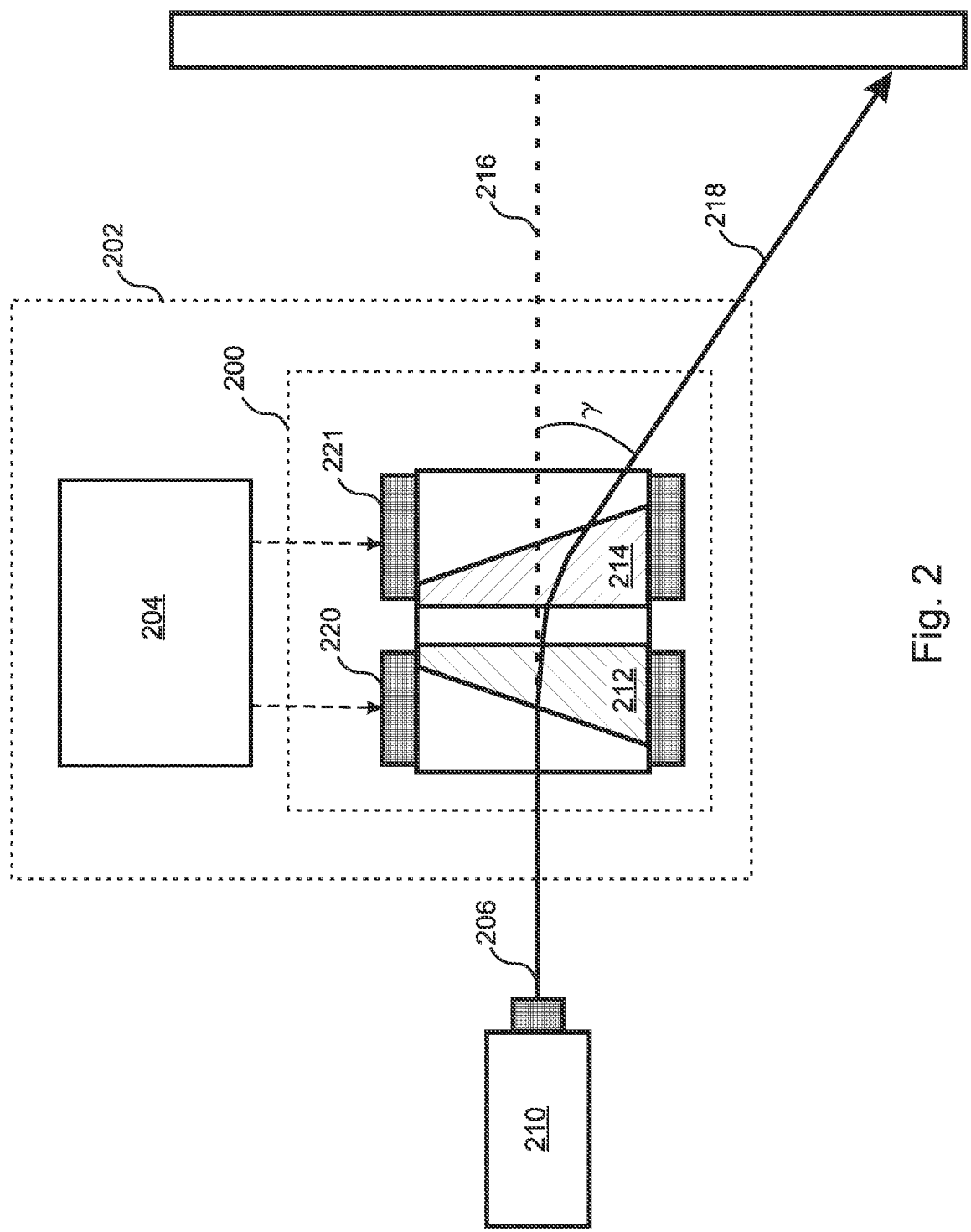
FIG. 2 is a block diagram of a Risley prism pointing system according to an embodiment of the present disclosure.

FIG. 2 illustrates a Risley pointing system 202 that deflects a single beam of light 206, such as a laser beam. The beam of light 206 enters the Risley pointing system 202 along its central rotation axis 216 from a fixed source 210, and is diffracted by the Risley pointing system 202 in a desired output pointing direction 218 that makes an angle $\gamma$ with the central rotation axis 216 and is rotated about the central axis 216 by an angle $\phi$ (not shown). In similar embodiments, beams of light or "frames" of light from a field of interest are directed by the Risley pointing system 202 from the desired pointing direction to a fixed target, such as a camera.

According to the present disclosure, with continuing reference to FIG. 2, in the exemplary embodiment the Risley pointing system 202 includes a Risley prism assembly (RPA) 200 and a controller 204. The RPA 200 includes prism elements 212, 214 that are rotatable by brushed or brushless DC RPA motors 220, 221 about a common, central rotation axis 216 as directed by the controller 204. The controller 204 is configured to calculate the rotations of the prism elements 212, 214 about the central axis 216 that are required to cause the incoming beam of light 206 entering the RPA 200 along the central axis 216 to emerge from the RPA 200 having a specified deflection angle $\gamma$ and rotation about the central axis of $\phi$ (not shown). In embodiments, the controller implements a method of calculating the required angular orientations that is disclosed in U.S. patent application Ser. No. 18/526,154, which is also by the present Applicant and is herein incorporated by reference in its entirety for all purposes.

Figure 3A:
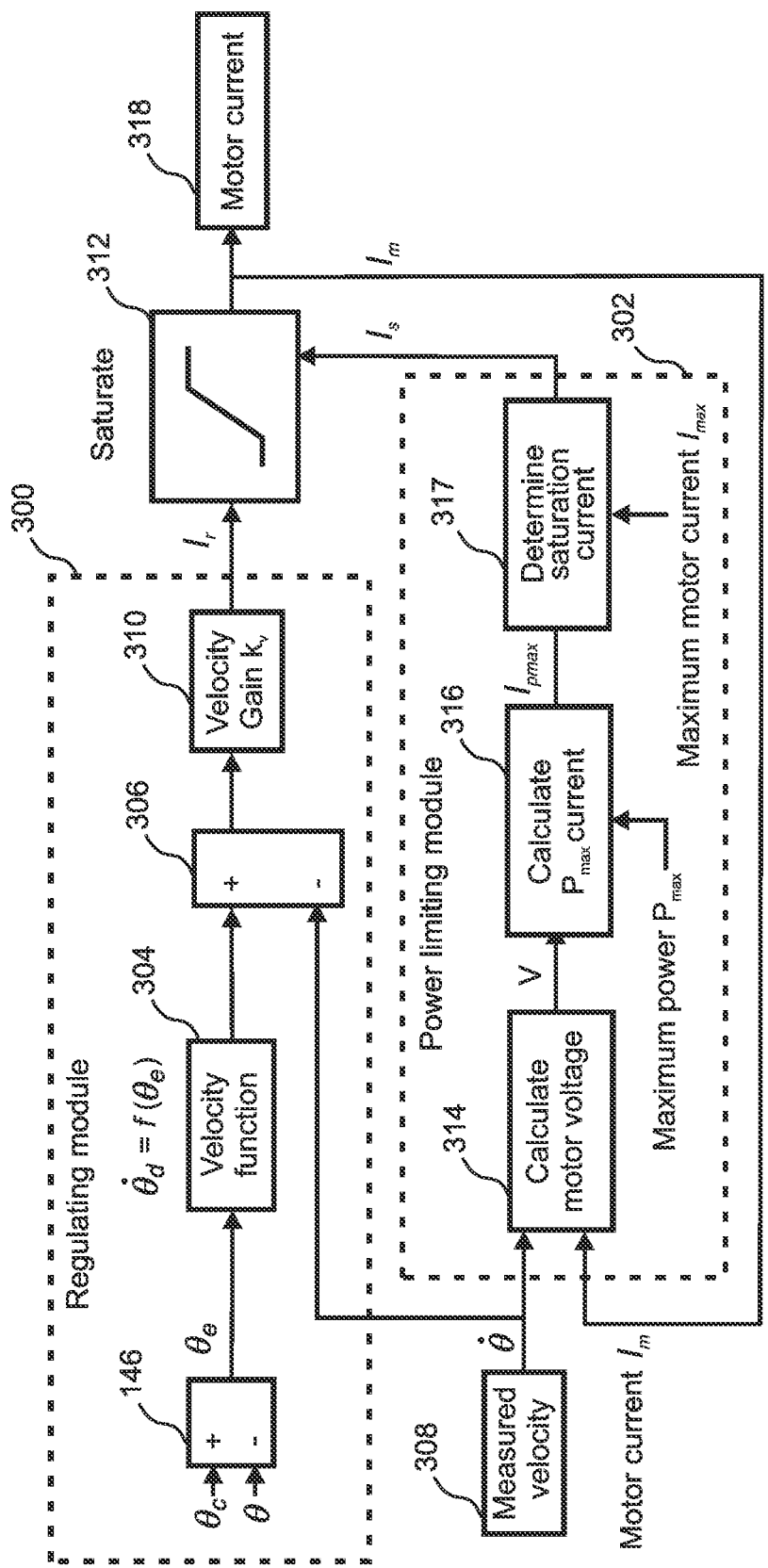
FIG. 3A is a simplified block diagram of a controller in an embodiment of the present disclosure.

FIG. 3A illustrates a rotation control method in an embodiment of the present disclosure that can be implemented, for example, by the controller 204 of FIG. 2 to rotate each of the prism elements 212, 214. The control method comprises two modules 300, 302 operating simultaneously during a rotation, which are a regulating module 300 and a power limiting module 302. For small rotations, and also during the later stages of large rotations, the regulating module 300 governs the rotation of a rotatable element according to a calculated velocity function 304. During the early stages of a large rotation, when the regulating module 300 would otherwise demand too much power, the power limiting module 302 governs the rotation of the rotatable element by providing as much torque as possible within the power constraints of the system. The regulating module 300 then assumes control once the velocity function 304 can be satisfied without exceeding the maximum power limits.

For each of the rotatable elements, the regulating module 300 periodically measures the angular position (orientation) θ of the rotatable element and compares it 146 with the "commanded" (destination) orientation $\theta_c$ for the rotatable element. The difference between them at any given time is referred to herein as the orientation "error" $\theta_e$. Rather than attempting to follow a pre-calculated orientation profile that is a function of time, $f(t)$, the disclosed regulating module 300 implements a velocity function $f(\theta_e)$ 304 that is not pre-calculated, but instead is calculated in "real time" during the rotation for each measured value of θ. To avoid overshoot, $f(\theta_e)$ is zero when $\theta_e$ is zero, so that the rotatable element reaches its destination with zero velocity. In embodiments, $f(\theta_e)$ is a linear function of $\theta_e$ in the limit of very small values of $\theta_e$, providing a well-damped and stable rotation as the rotatable element approaches its destination.

The velocity function $f(\theta_e)$ is always largest at the beginning of a rotation, and monotonically decreases to zero at the end of the rotation. At the beginning of a rotation, the rotatable element accelerates until its velocity matches $f(\theta_e)$. The regulating module then maintains the rotational velocity of the rotatable element substantially equal to $f(\theta_e)$ by applying a corresponding regulating current $I_r$ to the motor.

In various embodiments, the velocity function $f(\theta_e)$ is given by $$f(\theta_e) = \frac{\sqrt{\theta_p} \times k_p}{\sqrt{|\theta_e| + \theta_p}} \times \theta_e \quad (1)$$

In this equation, $k_p$ is the position loop gain factor, and $\theta_p$ is a linearity factor that affects the increasing linearity of the velocity function as the rotation nears completion. In some of these embodiments, $\theta_p$ is given by $$\theta_p = 1.8 \times \frac{k_t \times I_{dec}}{J_L \times k_p^2} \quad (2)$$

where the motor torque constant $k_t$ is numerically equal to the EMF constant $k_{emf}$ of the motor in metric units. It can be seen in Eqn. 1 that for small values of $\theta_e$, $f(\theta_e)$ is approximately equal to $k_p \times \theta_e$, so that $f(\theta_e)$ becomes a linear function of $\theta_e$ as the rotatable element reaches the end of its rotation. On the other hand, during the early stages of the rotation, $f(\theta_e)$ is approximately equal to $\sqrt{\theta_p} \times k_p \times \sqrt{\theta_e}$.

For each time increment $T_s$, the calculated value of the velocity function $f(\theta_e)$ is compared 306 with the measured angular velocity $\dot{\theta}$ 308 of the rotatable element, and the difference, i.e. the velocity error $\dot{\theta}_e$, is multiplied by the velocity loop gain $k_v$ to calculate a "regulating" motor current $I_r$ that would cause the motor to apply a torque to the rotatable element tending to accelerate or decelerate its rotational velocity $\dot{\theta}$, such that it approaches equality with $f(\theta_e)$. The calculated motor current $I_r$ is then forwarded to the saturation module 312.

During the rotation, the power limiting module 302 monitors the current that is drawn by the motor, and ensures that it never exceeds a maximum applicable motor current limit. At the same time, the power limiting module 302 calculates the power being drawn from the power source (referred to herein as the power supply), and ensures that it never exceeds a maximum applicable power draw limit.

For small rotations, applying regulating current $I_r$ to the motor may not exceed any of the applicable current or power limits, even at the beginning of the rotation, and so the regulating module 300 controls the entire rotation. However, during an initial stage of a larger rotation, the power limiting module 302 will limit the applied motor current to a "saturation" value $I_s$ that is less than $I_r$. This ensures that the rotatable element is accelerated as rapidly as possible, while remaining within applicable current and power constraints. Once it becomes possible to apply $I_r$ to the motor without exceeding the current and power limits, the regulating module 300 ensures that the rotatable element decelerates as rapidly as possible, while avoiding overshoot.

It should be noted that while the regulating module 300 may only govern the rotation during the deceleration phase of a large rotation, $f(\theta_e)$ is nevertheless calculated throughout the rotation, because $f(\theta_e)$ plays a key role in determining when the transition from acceleration to deceleration should occur. Specifically, in such cases the transition from acceleration to deceleration occurs when the angular velocity $\dot{\theta}$ first becomes equal to $f(\theta_e)$, and the power limiting module 302 relinquishes control to the regulating module 300.

In embodiments of the disclosed method, there are two power limitations to be considered, which give rise to two maximum motor currents that must not be exceed. The first power limitation is the maximum power that can be consumed by the motor without damaging the motor windings, and is equal to $(I_{max})^2 * R$, where $I_{max}$ is the maximum rated motor current at the expected maximum winding temperature, and R is the resistance of the motor windings. This limitation is independent of the rotation speed of the motor.

The second power limitation is the maximum power $P_{max}$ that the motor is allowed to draw from the power source, referred to generically herein as the power "supply," and current limit $I_{pmax}$ is the motor current that causes $P_{max}$ to be drawn from the power supply at any given time. If current limit $I_{pmax0}$ is defined to be the maximum current that can be provided to the motor at zero rotational speed without drawing more than Pmax from the power supply, then $$I_{pmax0} = \sqrt{\frac{P_{max}}{R}}.$$

In embodiments, the motor current is delivered via a pulse-width-modulated switching circuit, such as a variable frequency drive, such that the actual supply current differs from $I_{pmax}$. When the motor is at rest, $$P_{max} = I_{pmax0}^2 \times R \qquad (3)$$

However, when the motor is rotating, a reverse EMF is generated by the motor, such that $P_{max}$ is given by a quadratic equation:

$$P_{max} = I_{pmax}^2 \times R + I_{pmax} \times k_{emf} \times \dot{\theta} \qquad (4)$$

The voltage V that is applied at any given time is equal to the EMF plus R times the applied current. Therefore, the voltage $V_{max}$ that is applied when $P_{max}$ is reached is given by $$V_{max} = EMF + (R * I_{pmax}) \qquad (5)$$

and another expression for $P_{max}$ is $$P_{max} \text{ is equal to } V_{max} \text{ times } I_{pmax} \qquad (6)$$

The velocity function $f(\theta_e)$ requires a maximum available motor current value for deceleration $I_{dec}$. Variable $I_{dec}$ certainly must be less than the rated motor current $I_{max}$. It also must not require more than $P_{max}$ power from the power supply. Current limit $I_{pmax0}$ is calculated for the case of zero rotation speed, where the EMF is zero. Note that, when decelerating, the motor current is reversed to provide braking torque. As a result, the $I_{pmax0}$ current represents less power drawn from the supply than $P_{max}$ while decelerating. Therefore, an appropriate fixed value of maximum deceleration motor current $I_{dec}$ can be calculated as $$I_{dec} = \min(I_{max}, I_{pmax0}), \qquad (7)$$

where min( ) means the smaller of the two values.

The power limiting module 302 ensures that the current that is applied to the motor does not exceed a saturation current limit $I_s$, which, in absolute value, is equal to the smaller of $I_{max}$ and $I_{pmax}$. $I_{max}$ is typically a fixed value that does not change. However, $I_{pmax}$ depends on the EMF generated by the motor, and calculation of the EMF requires measurement of the angular velocity $\dot{\theta}$ of the rotatable element. The EMF is equal to the product of EMF constant $k_{emf}$ of the motor times $\dot{\theta}$. Constant $k_{emf}$ is numerically equal to the motor torque constant $k_t$ in metric units. The equation for Pmax is $$P_{max} = I_{pmax}^2 \times R + I_{pmax} \times k_{emf} \times \dot{\theta}. \qquad (8)$$

The above quadratic equation can be solved for Ipmax since the only other unknown is angular rate $\dot{\theta}$. Alternatively, Ipmax can be calculated using the measured motor current $I_{motor}$ in the following equations $$I_{pmax} = \frac{P_{max}}{|V_{motor}| + eps}, \qquad (9)$$

where eps prevents divide by zero errors and, $$V_{motor} = k_{emf} \times \dot{\theta} + I_{motor} \times R \qquad (10)$$

For example, in embodiments, $I_{pmax}$ is calculated at any given time according to the known current $I_m$ that is being applied to the motor and the measured angular velocity $\dot{\theta}$. Specifically, the applied voltage V is calculated according to $$V = (I_m * R) + EMF \qquad (11)$$

where $I_m$ is the motor current. $I_{pmax}$ is then calculated as given by $$I_{pmax} = P_{max}/|V| \qquad (12)$$

After $I_{pmax}$ is calculated by one of the two methods above, the saturation current $I_s$ is calculated with the following equation, $$I_s = \min(I_{pmax}, I_{dec}), \qquad (13)$$

where $I_{dec}$ is calculated according to eqn. (7). The current $I_{dec}$ rather than simply the motor rating $I_{max}$ is used in the equation to protect against a large impulse in current limit $I_s$ when the calculated voltage V in the denominator of eqn. (12) is small, or even zero such as it is at the start of a slew event. If Imax happens to be much higher than $I_{pmax0}$ the limit $I_s$ would start with an inappropriate high impulse on its leading edge at the start of a slew event.

Near the beginning of a rotation, when the angular velocity $\dot{\theta}$, and hence the reverse EMF voltage of the motor, is low, the saturation current $I_s$ will be at a maximum. However, for larger rotations, as the rotational velocity $\dot{\theta}$ of the rotatable element increases and the reverse EMF increases, $I_{pmax}$ will decrease and may become smaller (in absolute value) than $I_{max}$, such that $I_s$ will be equal $I_{pmax}$, and it will be necessary to decrease the saturation current $I_s$ so as to keep the power draw below $P_{max}$.

In embodiments, during each time increment $T_s$, the power limiting module 302 accepts as inputs the measured rotational velocity $\dot{\theta}$ 308 and the current $I_m$ that is being applied to the motor. The applied voltage V is calculated 314 according to eqn. (11), where the EMF is equal to the product of the EMF constant $k_{emf}$ of the motor times $\dot{\theta}$. $I_{pmax}$ is then calculated 316 according to Eqn. (12). In embodiments, a very small voltage offset constant eps is added to V to avoid divide-by-zero errors in this calculation.

$I_{pmax}$ is then compared with $I_{max}$ to determine 317 the saturation current $I_s$ as being the lesser of $I_{pmax}$ and $I_{max}$ in absolute value, which is also forwarded to the saturation module 312.

The saturation module 312 is configured to accept $I_r$ and $I_s$, and to output 318 the smaller (in absolute value) of the two as the current $I_m$ that is supplied to the motor.

The example of FIG. 2 includes two prism elements 212 and 214 each driven with one of two motors 220, 221. Considering, as an example, the action of the slew required of 212, during the initial phase of a large rotation (slew), the angular velocity $\dot{\theta}$ of the prism element 212 will be much less than $f(\theta_e)$, such that the regulating module 300 will request that a very large current $I_r$ be applied to the motor 220. However, at this point, for a large rotation, if the applied motor current $I_m$ were set equal to $I_r$, it would exceed the specified maximum current and/or power of the system. Instead, during this initial "acceleration" phase, the saturation module 312 selects $I_s$ to be the motor current $I_m$ that is applied to the prism element 212. Accordingly, during the acceleration phase of a large rotation, the applied motor current $I_m$ is equal to $I_s$, which is determined by the power limit module 302. The saturation module 312 thereby ensures that the specified current and power limits of the motor 220 and its power source are not exceeded.

Figure 3B:
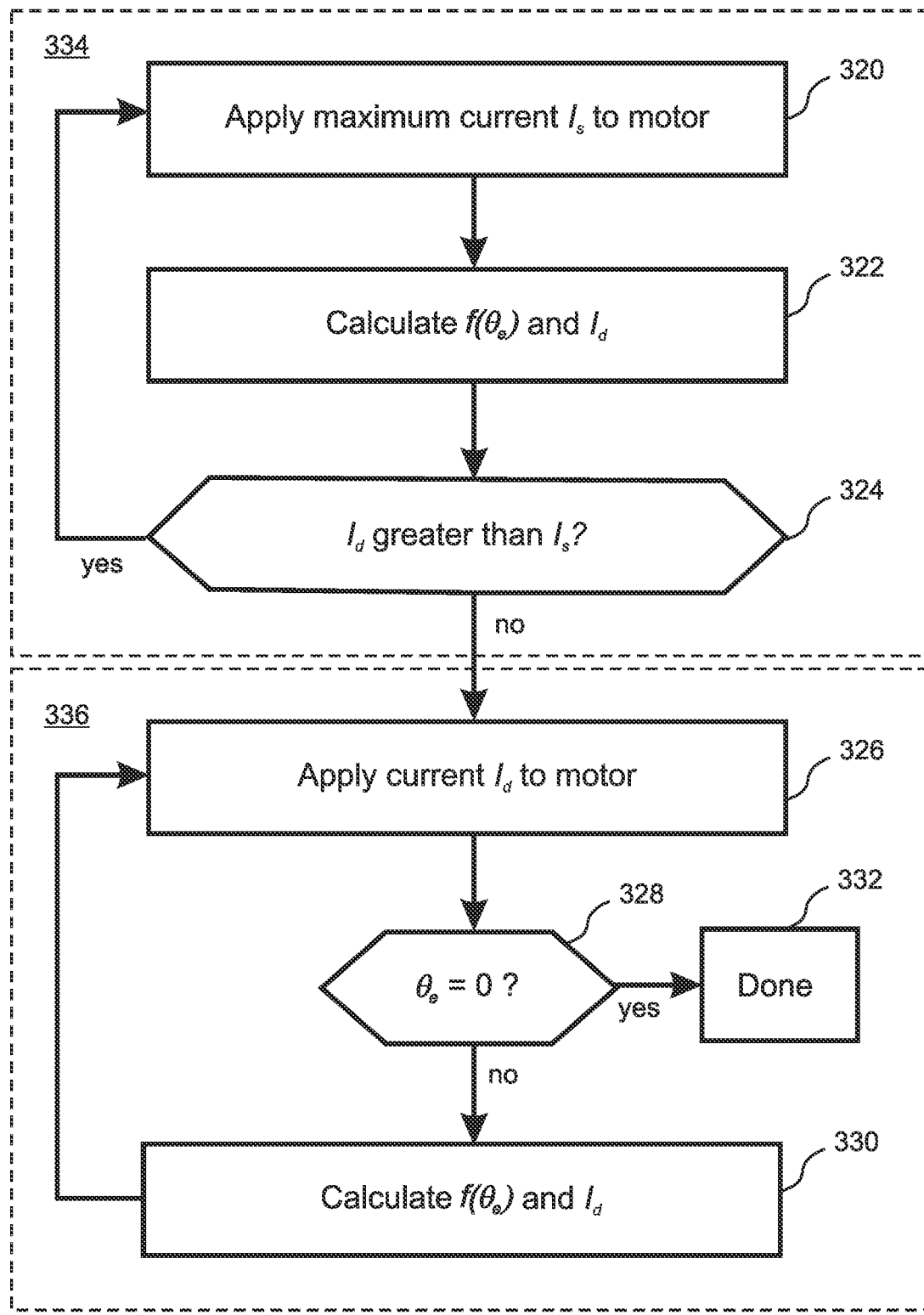
FIG. 3B is a flow diagram that illustrates control of the rotation of a rotatable element during a large rotation in an embodiment of the present disclosure.

The method that is implemented by the embodiment of FIG. 3A is illustrated by a flow diagram in FIG. 3B. During the beginning of a large rotation of a rotatable element, there will be a large difference between the velocity called for by the velocity function $f(\theta_e)$ and the achieved velocity. As a result, the maximum available current $I_s$ will be applied 320 to the motor that is driving the rotatable element. For each time increment $T_s$, a requested regulating current $I_r$ is calculated by the regulating module 300 based on a comparison between $\dot{\theta}$ and $f(\theta_e)$, and is compared with a maximum allowable "saturation" motor current $I_s$. During the acceleration phase 334, $I_r$ will be greater than $I_s$, and so the controller will continue to apply 320 the maximum current $I_s$ to the motor. The controller will continuously or periodically calculate $f(\theta_e)$ and $I_d$ 322 during the acceleration phase 320 until the rotational velocity $\dot{\theta}$ has been accelerated to be equal to $f(\theta_e)$, and $I_d$ is no longer greater than $I_s$ 324. At this point, the motor current will reverse polarity and the deceleration phase 336 will begin, with $I_r$ being applied 326 to the motor. The magnitude of $I_r$ will approach, but will not exceed, $I_s$. During the deceleration phase 336, the controller will continue to recalculate 330 $f(\theta_e)$ and $I_r$ after each time increment $T_s$, and will continue to apply $I_r$ to the motor in a reverse direction, until the rotatable element has reached its final destination 328, and the rotation has been completed 332. Thereafter the controller will continue to track the input command $\theta_c$ as an ordinary tracking loop until another angle change command $\theta_c$ is received, at which point another slew event will begin.

Figure 4:
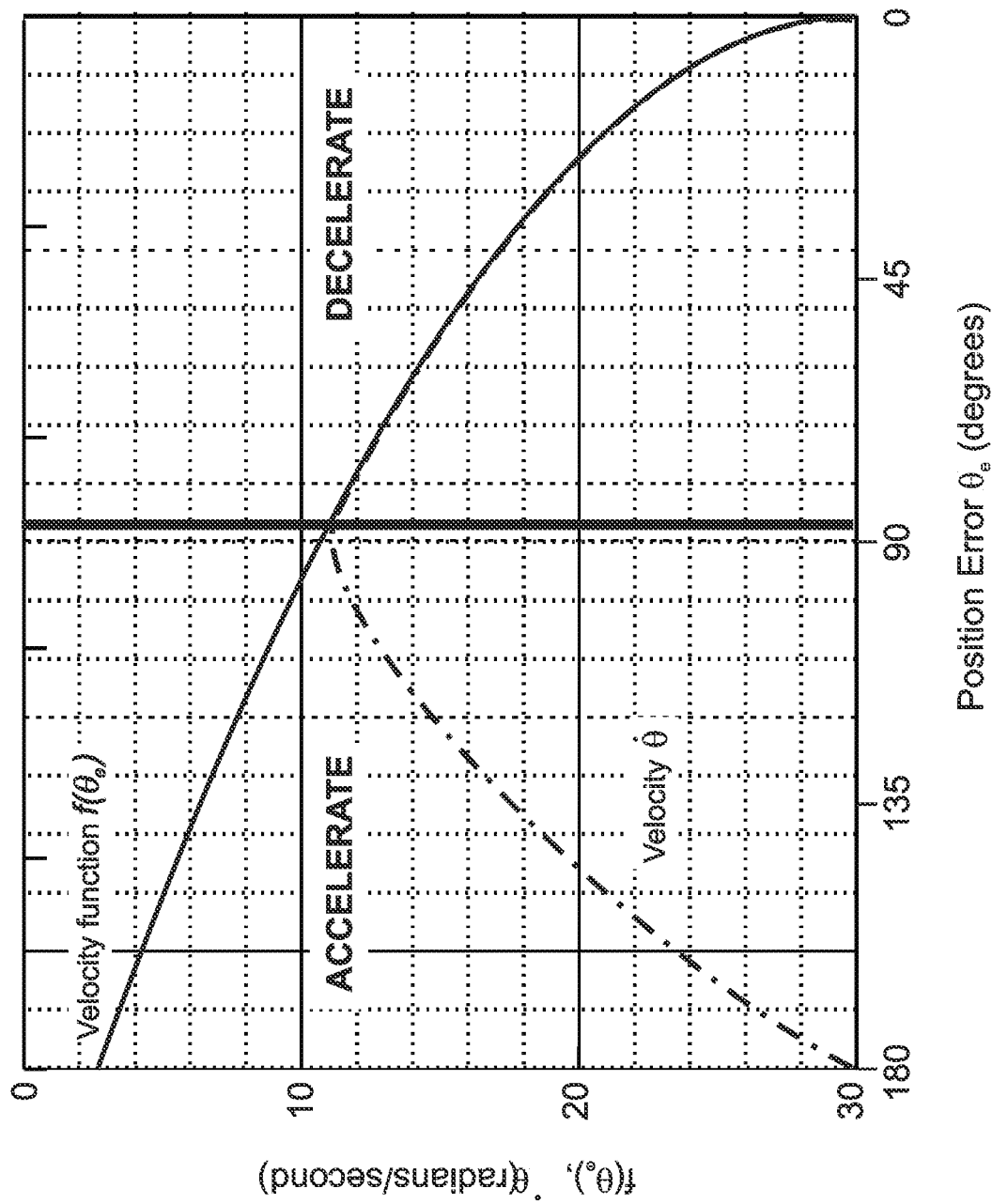
FIG. 4 is a graph that compares the calculated velocity function with the acceleration and deceleration of a rotatable element during a rotation in an embodiment of the present disclosure.

A typical example of an embodiment of the present disclosure is presented in the graph of FIG. 4. In the illustrated example, the actual rotational velocity $\dot{\theta}$ and the velocity function $f(\theta_e)$ are presented as functions of the orientation error $\theta_e$. Of course, time also proceeds from left to right across this graph during the rotation. It can be seen that the entire process is divided into an acceleration phase on the left, during which there is a significant difference between $\dot{\theta}$ and $f(\theta_e)$, and a deceleration phase on the right, during which $\dot{\theta}$ is approximately equal to $f(\theta_e)$. In this example, which represents a relatively large rotation, acceleration proceeds at the maximum allowable rate during the acceleration phase, until the rotational velocity $\dot{\theta}$ "catches up" to $f(\theta_e)$, at which point deceleration begins, and the rotational velocity $\dot{\theta}$ "tracks" $f(\theta_e)$ until both reach zero at $\theta_e=0$.

Figure 5:
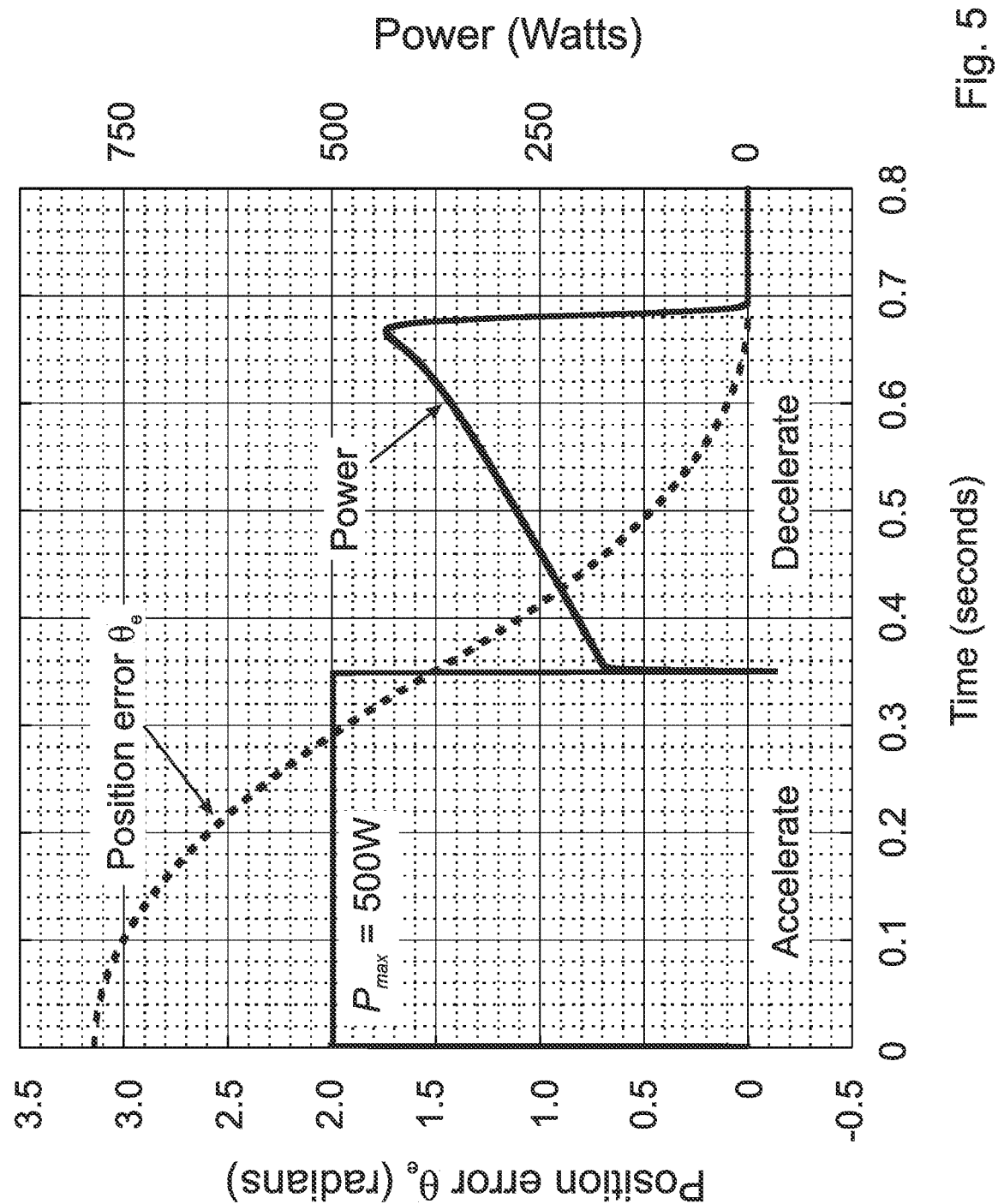
FIG. 5 is a graph that compares position error with applied power during a large rotation of a rotatable element in an embodiment of the present disclosure.

FIG. 5 presents a comparison of rotational position error $\theta_e$ and power applied to the motor as a function of time during a large rotation that requires approximately 0.7 seconds to complete. In this example, $P_{max}$ is specified to be 500 W, which is applied to the motor during the acceleration phase. It is assumed that in this example, $I_{pmax}$ is always less than $I_{max}$. When the transition to deceleration is reached, the power drops precipitously as the torque, and the applied motor current $I_m$ change direction, and then rises again, but remains below $P_{max}$ during the remainder of the rotation. It can be seen in the figure that the position error $\theta_e$ decreases smoothly to zero, without overshoot, at the end of the rotation.

Figure 6:
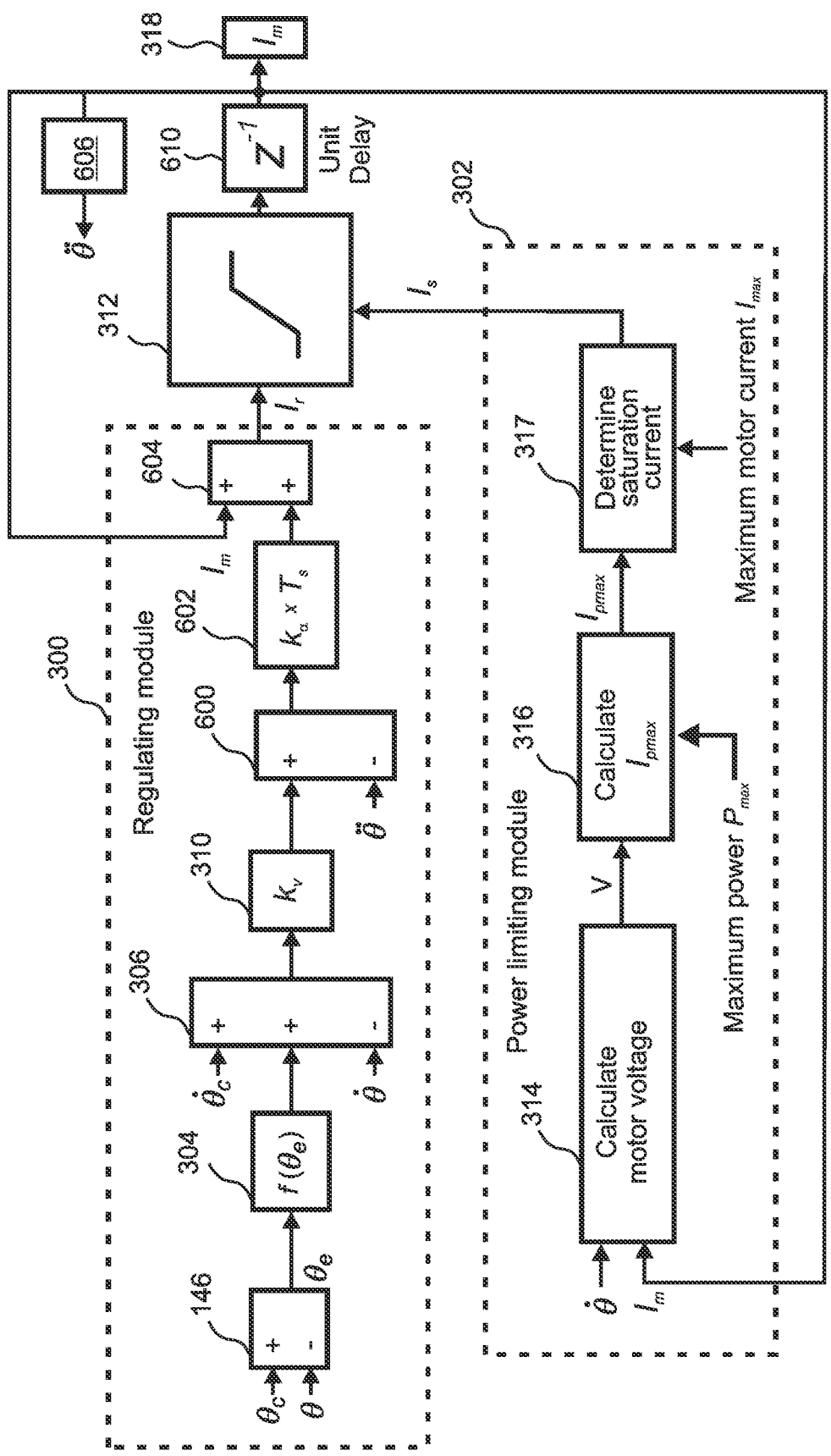
FIG. 6 is a detailed block diagram of a controller in an embodiment of the present disclosure.

FIG. 6 is a block diagram of an exemplary embodiment of the disclosed method that includes additional features as compared to FIG. 3A, thereby providing optimal performance. In particular, the comparison 306 of the calculated value of $f(\theta_e)$ with the measured angular velocity 308 of the rotatable element includes a second input $\dot{\theta}_c$ that functions as a "feed-forward" rate input to accommodate a time-varying position command $\theta_c(t)$, for example if the position command is not a simple "step" function. The velocity error $\dot{\theta}_e$ in this embodiment is the difference between the velocity $\dot{\theta}$ of the rotatable element and the sum of $f(\theta_e)$ and $\dot{\theta}_c$.

In addition, an acceleration comparator 600 is included that calculates a difference between the requested acceleration (output of element 310) and any acceleration $\ddot{\theta}$ that is already taking place 606. The difference is then directed to a loop gain module 602 that applies a "sampling period" gain equal to the product of the acceleration loop gain factor $k_\alpha$ and the sampling period $T_s$. This sampling period gain is combined with an accumulating module 604 that is updated at rate $1/T_s$. Together with a unit delay module 610, which delays the output of the saturation module 312 by one sampling period $T_s$, the loop gain module 602 produces the effect of an integrator with unity gain, the output of which $I_r$ is directed to the saturation module 312.

The output of the delay module 610 is the motor current $I_m$. The accumulator 604, 610 provides the DC infinite gain that is needed to drive the rotational velocity error $\dot{\theta}_e$ to zero. If there is a persistent velocity error $\dot{\theta}_e$, the accumulator loop 604, 610 will request a motor current $I_r$ that will reduce it. In this way a persistent velocity error $\dot{\theta}_e$ will cause the accumulator 604, 610 to ramp the requested motor current $I_r$ up or down to cause the motor to remove the persistent error $\dot{\theta}_e$. This nulling action of the accumulator 604, 610 does not stop until the velocity error $\dot{\theta}_e$ is driven to zero. During deceleration, the only limit on how much current will be applied to reduce $\dot{\theta}_e$ is if the saturation current $I_s$ is reached.

Fast settling after a large step in position $\theta_c$ is improved in this embodiment by placing the accumulator (integrator) 604, 610 in the acceleration loop as shown in FIG. 6. The benefit is in eliminating integrator wind up. In contrast, if the integrator were part of the position control function 146, the integrator would continue to increase the requested acceleration, i.e. the requested motor current $I_r$, and hence the requested motor torque, and would only stop increasing when the position error $\theta_e$ reached zero, which would be too late to prevent overshoot. Thus the integrator would enter a wind-up condition calling for torque uselessly, causing the loop to overshoot $\theta_e=0$, and requiring extra time to settle back to the destination $\theta_c$.

As in the embodiment of FIG. 3A, the saturation current $I_s$ is chosen in the embodiment of FIG. 6 to be the smallest of $I_{max}$ and $I_{pmax}$ in absolute value. The motor current limit $I_{max}$ will generally dominate near the beginning of the rotation, when the angular velocity $\dot{\theta}$, and hence the reverse EMF voltage of the motor, are low, and the applied voltage V is approximately equal to the desired current multiplied by the winding resistance R of the motor. However, as the rotational velocity $\dot{\theta}$ of the rotatable element increases, and additional voltage is required to overcome the reverse EMF voltage, the saturation current $I_s$ will be the maximum current $I_{pmax}$ that can be applied to the motor without exceeding the specified motor current $I_{max}$ and maximum power draw $P_{max}$ from the power supply. Accordingly, the output of the saturation current limiter 608 is $I_s$, which is the lesser of $I_{pmax}$ and $I_{max}$ in absolute value.

In the exemplary rotation of prism element 212 of FIG. 2, as described above, the regulating module 300 includes gain adjustments that provide optimal deceleration of the prism element 212, 214 without overshooting the destination $\theta_c$ during the deceleration phase. In various embodiments, these include position, velocity, and acceleration loop gains, referred to herein as $k_p$, $k_v$, and $k_\alpha$, respectively. In embodiments, these loop gains are tuned for generous gain and phase margins, so that the settling to $\theta_c$ will be well-behaved at the end of the rotation.

In combination, therefore, the regulating 300 and power limiting 302 modules of the present disclosure work together to cause the rotatable element to accelerate as rapidly as possible during the acceleration phase, and then to follow a deceleration velocity curve $f(\theta_e)$ that is calculated in real-time by the regulating module.

Figure 7:
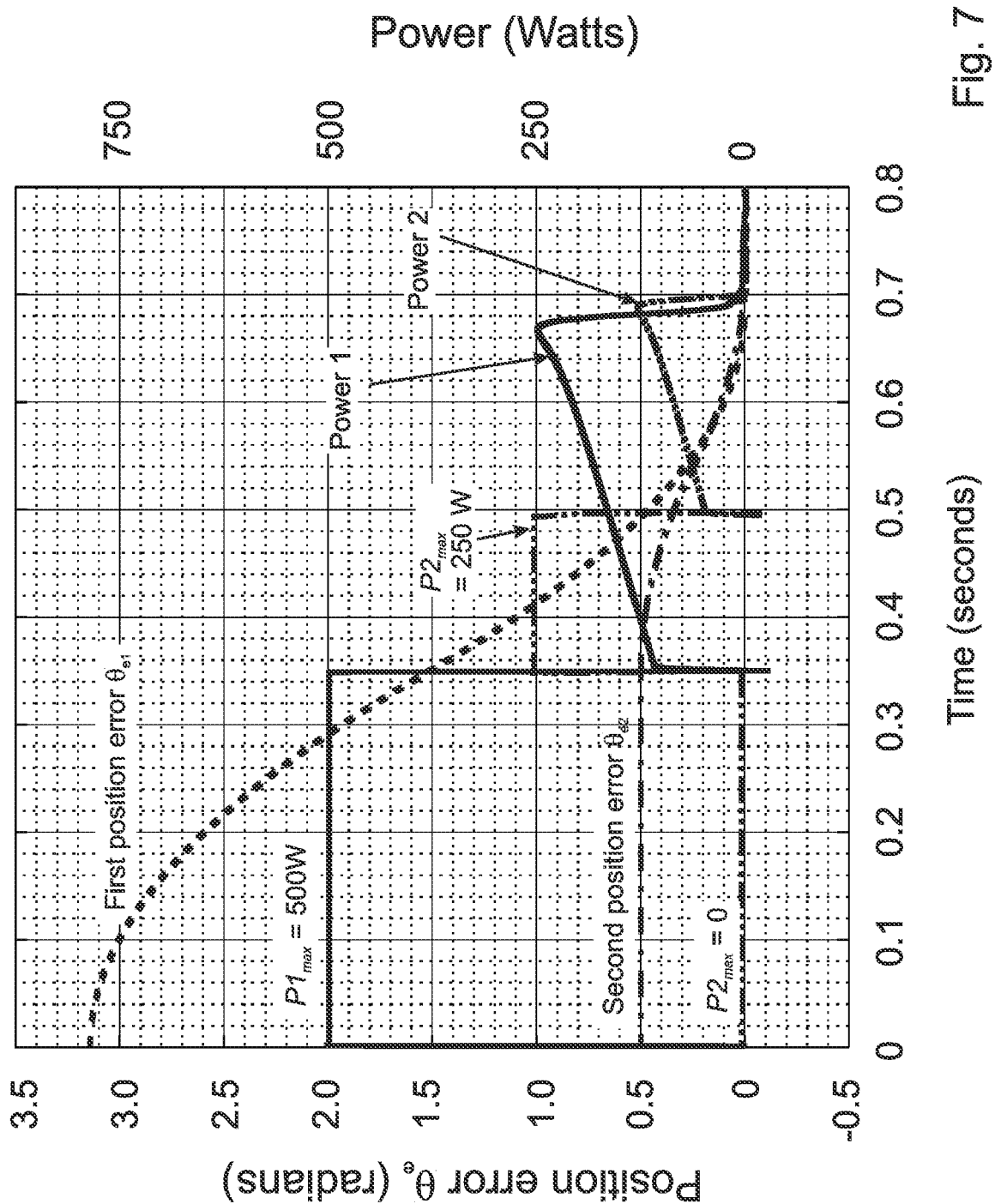
FIG. 7 is a graph that compares position errors and applied power for two simultaneously rotated elements, where one of the rotatable elements undergoes a large rotation and the other rotatable element undergoes a relatively smaller rotation.

With reference to FIG. 7, for applications where rotation of more than one rotatable element is required, such as rotation of both prism elements 212, 214 of an RPA 200, embodiments distribute the available power by assigning a maximum power $P_{maxi}$ to each of the loads, such that the sum of all of the loads i=1 to j will never exceed the overall specified maximum $P_{max}$. For example, some embodiments that are applicable to Risley pointing systems 202 assign more power to the prism element 212 that requires the largest rotation, so that the net slew time required to complete both rotations can be minimized. In embodiments, the controller 204 estimates the slew times as a function of $P_{max}$ for each of the RPA prism elements 212, 214, based on the required orientation changes, the motor torque constants $k_t$, and motor current limits $I_{max}$, as well as the moments of inertia $J_L$ of the prism elements, and then allocates the maximum allowed power between the two RPA prism elements 212, 214, such that the net slew time for the RPA 200 as a whole is minimized, while the sum of the values of $P_{max}$ for the two elements 212, 214 never exceeds the specified maximum power for the RPA 200. In some of these embodiments, $P_{max}$ for one or both of the prism elements 212, 214 can be variable during the rotation period, so long as the sum of $P_{max1}$ and $P_{max2}$ does not exceed the overall limit $P_{max}$.

In the example of FIG. 7, the controller 204 is required to rotate the first prism element 212 through an angle of 180 degrees ($\pi$ radians), while the second prism element 214 requires a rotation of only 0.5 radians. As in FIG. 5, the maximum total power $P_{max}$ is specified to be 500 W. In this example, the controller 204 initially assigns a maximum power $P_{max1}$ to the first prism element 212 of 500 W, while assigning a maximum power $P_{max2}$ of zero to the second prism element 214. As a result, the first prism element 212 begins to rotate and the position error $\theta_{e1}$ of the first prism element 212 begins to decrease, while the second prism element 214 remains stationary, and $\theta_{e2}$ remains equal to 0.5 radians.

In the illustrated example, this continues until the first prism element 212 begins its deceleration, and the power applied to the first prism element 212 is decreased to below 250 W, as in the example of FIG. 5. At this point, $P_{max2}$ is increased to 250 W, and the second prism element 214 begins to rotate. Eventually, the second prism element 214 enters a deceleration phase, and both of the prism elements 212, 214 reach their final orientations at the same time at t=0.7 seconds. Note that the sum of the power applied to each of the two prism elements 212, 214 never exceeds 500 W in this example. Yet, by giving the first prism element 212 a "head start," the total slew time for the change in pointing direction of the RPA 200 is decreased below what could be achieved if $P_{max1}$ and $P_{max2}$ both had fixed values throughout the entire slew time.

Simulink® Model

Figure 8:
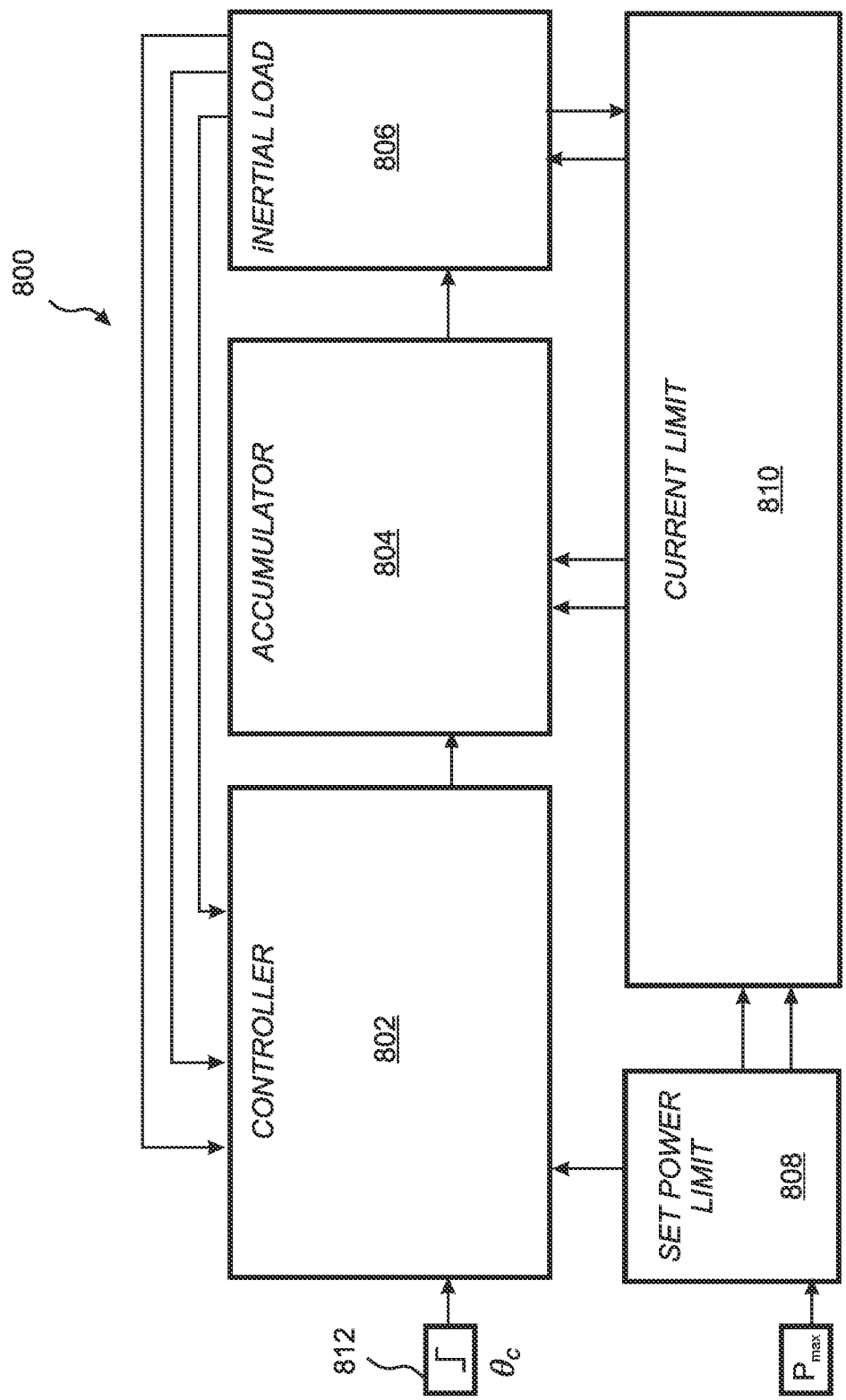
FIG. 8 is a block diagram of a Simulink® model of an embodiment of the present disclosure.
Figure 9A:
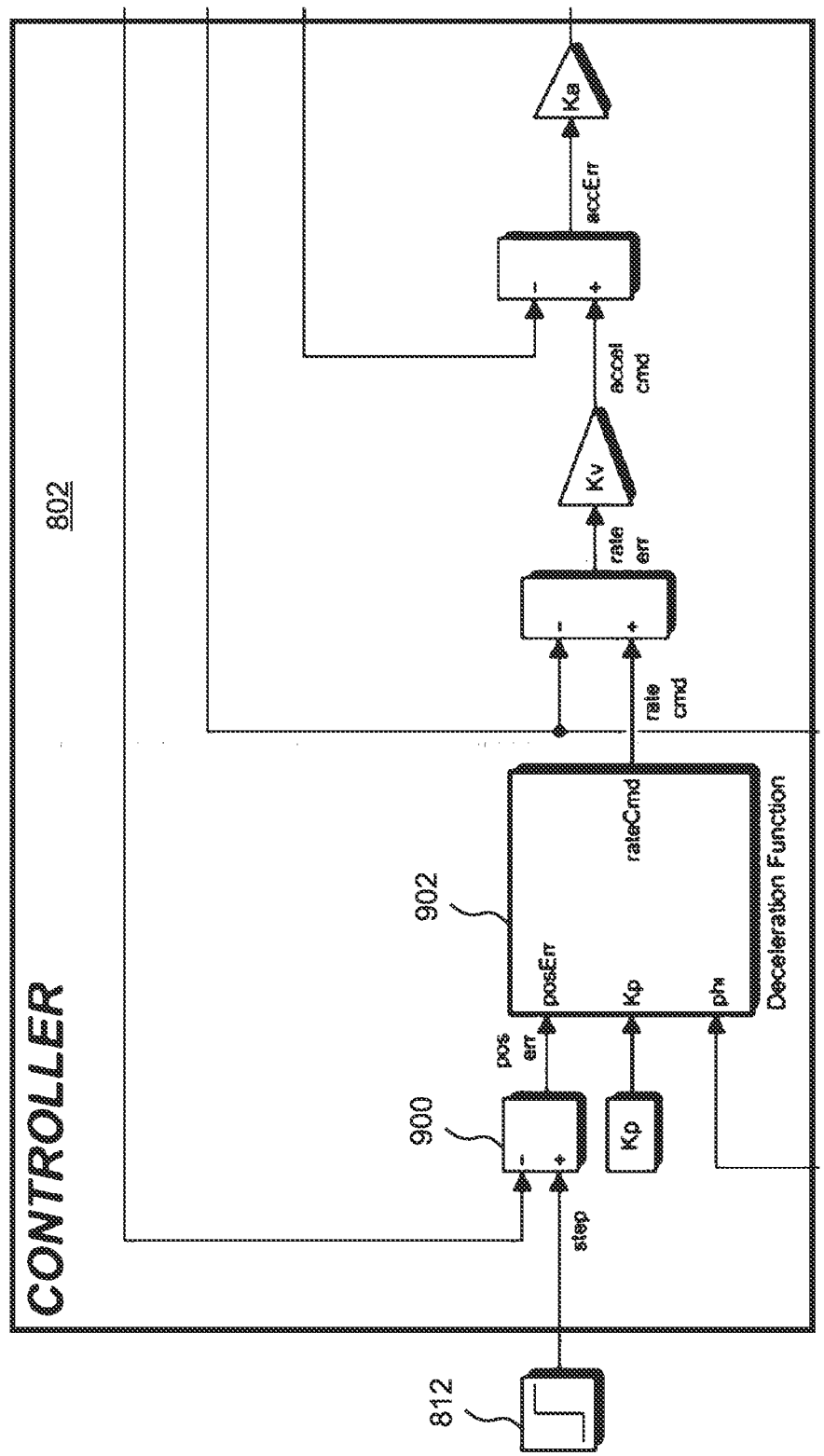
FIG. 9A is a block diagram of the controller module of FIG. 8.
Figure 10:
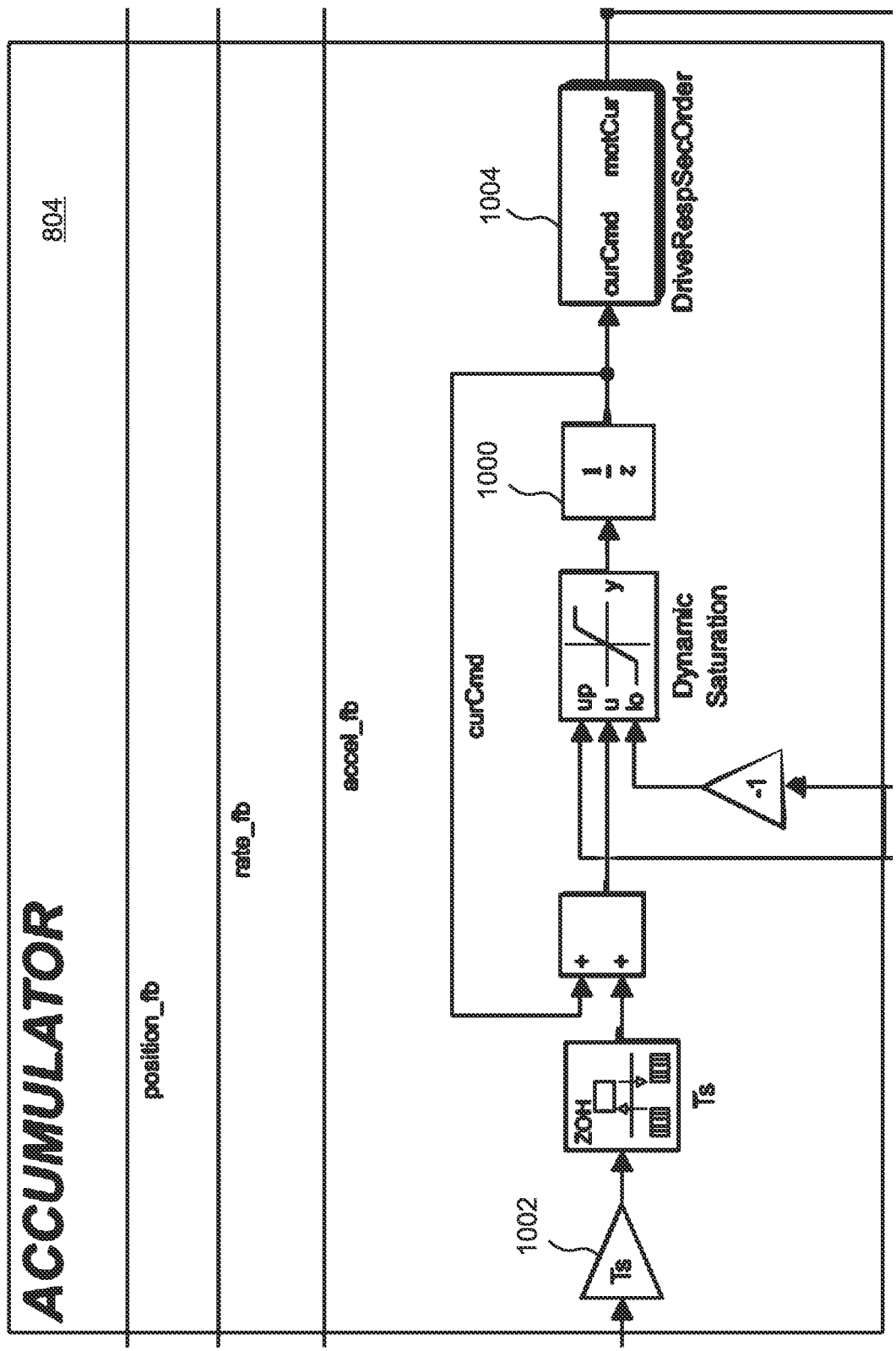
FIG. 10 is a block diagram of the Accumulator module of the model of FIG. 8.
Figure 11:
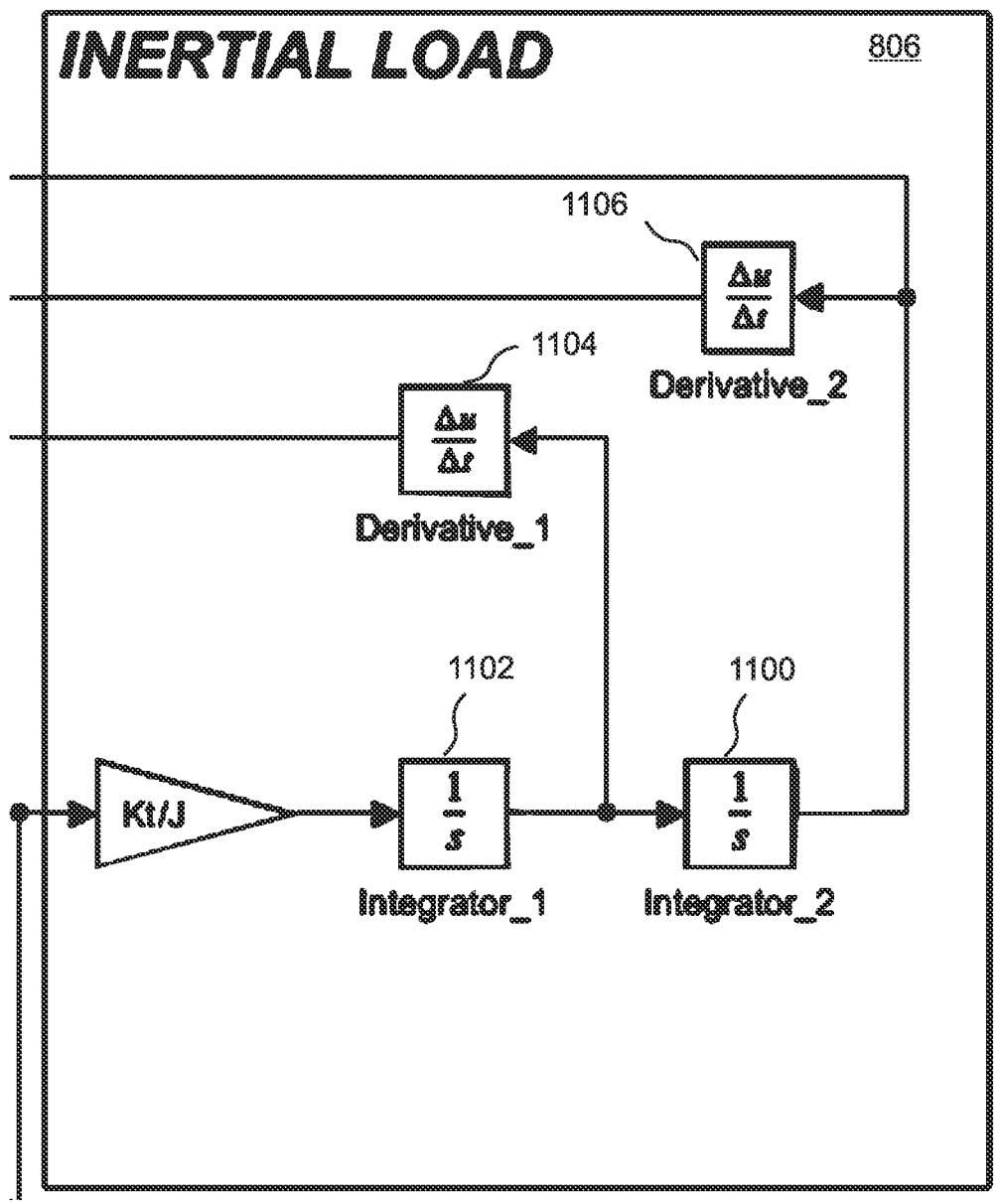
FIG. 11 is a block diagram of the Inertial Load module of the model of FIG. 8.

FIGS. 8 through 13B present a Simulink® model that was used to generate the curves in FIGS. 4, 5, and 7, and is designed to illustrate the performance characteristics of embodiments of the present disclosure. (Simulink® is a trademark of MathWorks, Inc.) FIG. 8 is an overall block diagram of the model 800, which includes a Controller 802, an Accumulator 804, an Inertial Load 806, a Set Power Limiter 808, and a Current Limiter 810. The commanded action that is modeled is a 180-degree step input 812 shown at the left of FIG. 8. The angle of the rotational load that follows the step command is represented as the output of integrator_2 (1100 in FIG. 11) of the Inertial Load 806. The output angle is fed back to the Controller 802 for comparison 900 to the step command input 812, as shown in FIG. 9A. Just behind Integrator_2 in FIG. 11 is "Integrator_1" 1102 that converts acceleration to rate.

The control is architected in layers, with an inner-most loop on acceleration, an intermediate loop on rate, and finally an outer loop on position. All three error signals, acceleration, rate, and angle, are calculated in the section labeled Controller 802. The integrator function in the control model is provided by a discrete-time accumulator located in the Accumulator section 804. The section labeled Set Power Limit 808 facilitates parameter changes based on the allocated power $P_{max}$, which can change from one slew event to another. Finally, the Current Limit section 810 provides a mechanism to limit power drawn from the motor drive.

With reference to FIG. 9A, the Deceleration Function of the controller 902 generates a non-linear output that provides the desired deceleration response, which is braking the speed with near constant torque to the destination and then settling without overshoot. The function is shown in FIG. 9B. Parameter phi is shown as a variable input because it changes with the setting of maximum power $P_{max}$, which may be changed by dynamic power budgeting as described in reference to FIG. 7 above. The variables Kp, Kv, and Kα are respectively the position, velocity, and acceleration loop gains.

With reference to FIG. 10, The Accumulator section 804 provides the mechanism to limit power draw, and provides an integration function. The discrete-time accumulator will saturate at upper and lower bounds that are equal in magnitude but opposite in polarity. If, for instance, the input at "u" attempts to drive output "y" passed its upper limit "up," the output "y" will remain at its limit. The 1/z block 1000 is a unit delay at the update period Ts. The Ts gain stage 1002 at the input of the accumulator stage 804 provides an overall response like a continuous time integrator of unity gain, which is useful for setting the initial acceleration loop gain Kα. Finally, the block DriveRespSecOrder 1004 simulates the response of the amplifier that converts the current command to an actual motor current.

With reference to FIG. 11, The Inertial Load section 806 simulates the motor 220 with parameter Kt, the load inertia with parameter J, the load speed with Integrator_1 1102, the load position with integrator_2 1100, the encoder-sensed rate with Derivative_1 1106, and the encoder-sensed acceleration with Derivative_2 1104. The feedback parameters for position, rate, and acceleration are all generated by this section 806.

Figures 12A, 12B:
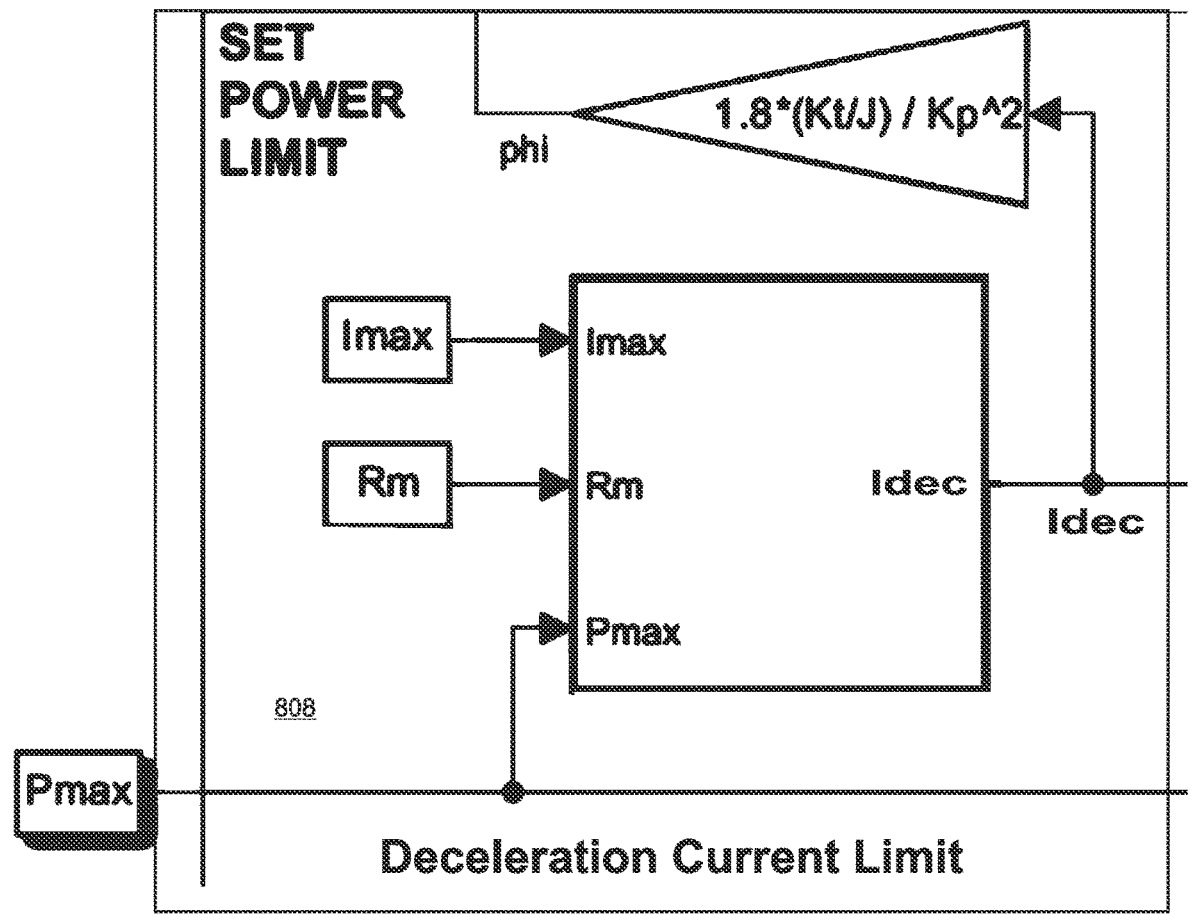
FIG. 12A is a block diagram of the Set Power Limit module of the model of FIG. 8.
FIG. 12B is a Deceleration Current Limit function of the model of FIG. 8.

The Set Power Limit section 808 is illustrated in FIG. 12A, and the Power Adjust function is shown in FIG. 12B. The input variable $P_{max}$ is a variable input rather than a constant parameter, as it may be set to various values when in service. There are two candidates for the maximum current $I_s$. One is the rated current for the motor $I_{max}$ that should not be exceeded. The other is the current that will produce $P_{max}$ in the motor winding when the rotor speed is zero, such that all the power sent to the motor is dissipated in the windings. The function in FIG. 12B selects the smaller of the two current values and outputs as Ipmax. Parameter phi varies with Ipmax, and therefore also changes with Pmax.

Figure 13A:
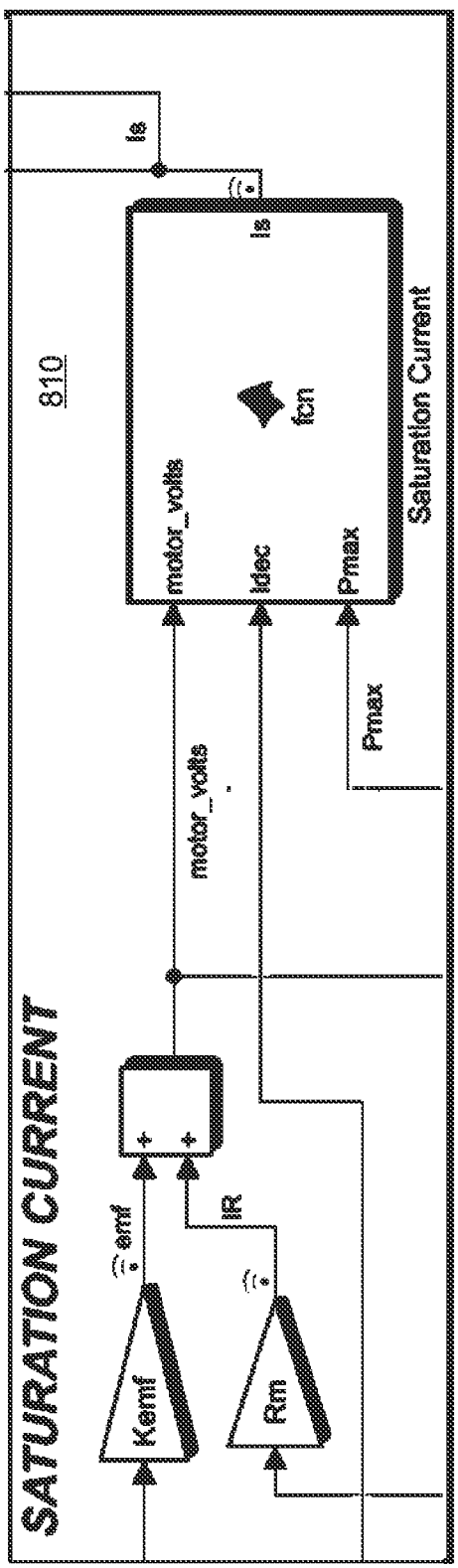
FIG. 13A is a block diagram of the Saturation Current module of the model of FIG. 8.

The Current Limit section 810 is shown in FIG. 13A and the Dynamic Current Limit function is given in FIG. 13B. The Current Limit section 810 controls the positive and negative saturation values of the discrete-time accumulator in the Accumulator section 804. The gain constant $K_{emf}$ is multiplied by the motor speed to give the EMF voltage. The motor resistance Rm is multiplied by the motor current to give the IR drop. The sum of the two voltages is the voltage across the motor, which for the purposes of the simulation is modeled as a two-terminal motor. Performance is the same for an equivalent brushless DC motor with sinusoidal commutation, which is a very common implementation. A functional block could be added that converts a three-phase brushless DC motor to an equivalent brushed motor at the input/output terminals of the block, but that would add complexity and add no value here. The current value of the $I_{pmax}$ is calculated by dividing $P_{max}$ by the motor voltage. The absolute value of the motor voltage is used, because the slew could go in either direction. Note that during the acceleration phase, the power absorbed by the EMF voltage increases, so the power dissipated due to the motor winding resistance must diminish to maintain a constant power draw on the supply.

DEFINITIONS OF SYMBOLS

Symbol Definition $\theta_c$ Angle command—end destination of rotation
$\theta$ Measured angle of motor shaft (function of time)
$\theta_e$ Angle error, difference between $\theta$ and $\theta_c$
$\theta_p$ Angle error at transition from square-law characteristic to linear characteristic
$\dot{\theta}_c$ Rate command (rate feed-forward option)
$\dot{\theta}$ Measured rotation rate
$\ddot{\theta}$ Acceleration rate
eps Smallest number in representation in computer, added to avoid divide-by-zero
$I_{dec}$ Maximum deceleration motor current
$I_m$ Motor current
$I_{max}$ Maximum motor current allowed by motor current rating
$I_{pmax}$ Maximum motor current allowed by $P_{max}$
$I_{pmax0}$ Maximum motor current allowed by $P_{max}$ when motor speed is zero
$I_s$ Saturation current (maximum motor current, lesser of $I_{max}$ and $I_{pmax}$ in absolute value)
$J_L$ Moment of inertia of rotatable element
$k_t$ Motor torque constant
$k_{emf}$ Back EMF constant of motor (numerically equal to $k_t$ in metric units)
$k_p$ Position loop gain when $\theta_e \ll \theta_p$
$k_v$ Velocity loop gain constant
$k_\alpha$ Acceleration loop gain constant
R Motor winding resistance
$P_{max}$ Limit on power drawn by motor
$T_s$ Sample period
V Voltage across motor
$Z^{-1}$ Unit delay The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/–0.1% of the stated value (or range of values), +/–1% of the stated value (or range of values), +/–2% of the stated value (or range of values), +/–5% of the stated value (or range of values), +/–10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An apparatus comprising:
a rotatable element;
a motor configured to rotate the rotatable element; and
a controller;
wherein the controller is configured to cause the motor to rotate the rotatable element from an initial angular orientation $\theta_0=0$ to a commanded final angular orientation $\theta_c$ by:
A) determining an orientation $\theta$ and a rotational velocity $\dot{\theta}$ of the rotatable element;
B) calculating a velocity function $f(\theta_e)$, where $\theta_e=\theta_c-\theta$, said velocity function being a calculated angular velocity that monotonically decreases as $\theta_e$ decreases, and is equal to zero when $\theta_e=0$;
C) calculating a regulating current $I_r$, which, when applied to the motor, will cause $\dot{\theta}$ to approach and then remain equal to $f(\theta_e)$;
D) calculating a power that will be consumed by the motor when current $I_r$ is applied to the motor;
E) calculating a saturation current $I_s$, the saturation current being a maximum current that can be applied to the motor without exceeding a specified current or power limitation of the system;
F) if $|I_r|$ is less than $|I_s|$, applying $I_r$ to the motor, otherwise applying $I_s$ to the motor; and
G) repeating steps A) through F) until $\theta=\theta_c$.

2. The apparatus of claim 1, wherein $f(\theta_e)$ is approximately proportional to $\theta_e$ for small values of $\theta_e$.

3. The apparatus of claim 1, wherein $f(\theta_e)$ is approximately proportional to $\sqrt{\theta_e}$ for large values of $\theta_e$.

4. The apparatus of claim 1, wherein $$f(\theta_e) = \frac{\sqrt{\theta_p} \times k_p}{\sqrt{|\theta_e| + \theta_p}} \times \theta_e,$$

said $k_p$ and $\theta_p$ being constants, $k_p$ being a position loop gain factor, and $\theta_p$ being a linearity factor.

5. The apparatus of claim 4, wherein $$\theta_P = 1.8 \times \frac{k_t \times I_{dec}}{J_L \times k_p^2},$$

said $k_t$ being a motor torque constant that is numerically equal to an EMF constant $k_{emf}$ of the motor in metric units, said $J_L$ being a moment of inertia of the rotatable element of the system, and said $I_{dec}$ being a the smaller of $I_{max}$ which is the maximum rated motor current at an expected maximum winding temperature of the motor and $I_{pmax0}$ which is the maximum motor current allowed by $P_{max}$ when motor speed is zero.

6. The apparatus of claim 1, wherein $I_{max}$ is a maximum rated motor current at an expected maximum winding temperature of the motor, and wherein step E) includes calculating a maximum current $I_{pmax}$ that can be applied to the motor without exceeding a maximum power $P_{max}$ that can be drawn from a power source by the motor, and setting $I_s$ equal to whichever of $I_{pmax}$ or $I_{max}$, is smaller in absolute value.

7. The apparatus of claim 6, wherein:
V is a calculated voltage being applied to the motor, V being equal to $(I_m \times R)+(k_{emf} \times \dot{\theta})$;
$I_m$ is a current being applied to the motor;
R is a winding resistance of the motor;
$k_{emf}$ is an EMF constant of the motor that is numerically equal to a motor torque constant $k_t$ of the motor in metric units; and
calculating $I_{pmax}$ comprises setting $$I_{pmax} = \frac{P_{max}}{V}.$$

8. The apparatus of claim 1, wherein in step C), calculating the regulating current $I_r$ includes applying a velocity gain factor $k_v$ to a difference between $\dot{\theta}$ and $f(\theta_e)$.

9. The apparatus of claim 1, wherein in step C), calculating the regulating current $I_r$ includes calculating an acceleration $\ddot{\theta}$ of the rotatable element, applying an acceleration gain factor $k_\alpha$, and applying an integrator as part of an acceleration loop.

10. An apparatus comprising:
a plurality of N rotatable elements;
a corresponding plurality of N motors, each of the motors being configured to rotate a corresponding one of the rotatable elements, the motors and rotatable elements being indexed by an integer i=1 to N; and
a controller;
wherein the controller is configured to cause the plurality of motors to rotate the rotatable elements from corresponding initial orientations $\theta_{0i}$ to corresponding commanded final orientations $\theta_{ci}$ by:
I) assigning to each of the motors a maximum power draw $P_{maxi}$, where the sum over i of the $P_{maxi}$ is equal to a collective maximum power draw $P_{max}$, $P_{max}$ being thereby apportioned among the rotatable elements; and
II) concurrently, for each of the motors and corresponding rotatable elements:
A) determining an orientation $\theta$ and a rotational velocity $\dot{\theta}$ of the rotatable element;
B) calculating a velocity function $f(\theta_e)$, where $\theta_e=\theta_c-\theta$, said velocity function being a calculated angular velocity that monotonically decreases as $\theta_e$ decreases, and is equal to zero when $\theta_e=0$;
C) calculating a regulating current $I_r$ which, when applied to the motor, will cause $\dot{\theta}$ to approach and then remain equal to $f(\theta_e)$;
D) calculating a power that will be consumed by the motor when current $I_r$ is applied to the motor;
E) calculating a saturation current $I_s$, the saturation current being a maximum current that can be applied to the motor without exceeding $P_{maxi}$, and
F) if $|I_r|$ is less than $|I_s|$, applying $I_r$ to the motor, otherwise applying $I_s$ to the motor; and III) repeating steps I) and II) until $\theta_i=\theta_{ci}$ for all of the rotatable elements.

11. The apparatus of claim 10, wherein the controller is further configured to vary at least one of the $P_{maxi}$ during the slew time.

12. The apparatus of claim 10, wherein apportioning $P_{max}$ includes assigning the $P_{maxi}$ such that all of the rotatable elements arrive at their corresponding final orientations at the same time.

13. The apparatus of claim 10, wherein apportioning $P_{max}$ includes assigning the $P_{maxi}$ according to a magnitude of rotation required of each of the rotatable elements, whereby those of the rotatable elements that are required to rotate relatively further are assigned relatively larger $P_{maxi}$.

14. The apparatus of claim 10, wherein the system is a Risley pointer, and two of the rotatable elements are Risley prism elements of the Risley pointer.

15. The apparatus of claim 10, wherein:
the apparatus is a Risley pointing system comprising:
first and second independently rotatable Risley prism elements; and
first and second motors configured respectively to rotate the first and second Risley prism elements about a common axis; and
wherein the apparatus further comprises a controller that is configured to:
accept a desired pointing direction;
calculate respective first and second orientations $\theta_{c1}$ and $\theta_{c2}$ of the first and second Risley prism elements that will cause the RPA to point in the desired pointing direction; and
apply steps I) through III) to the motors and prism elements.

16. A computer program product including one or more non-transitory machine-readable mediums encoded with instructions that, when executed by one or more processors, cause a process to be carried out for controlling a Risley pointer assembly, the process comprising instructing a motor to rotate a first assembly of wedge prisms from an initial angular orientation $\theta_0=0$ to a commanded final angular orientation $\theta_c$ by:
A) determining an orientation $\theta$ and a rotational velocity $\dot{\theta}$ of the first assembly of wedge prisms;
B) calculating a velocity function $f(\theta_e)$, where $\theta_e=\theta_c-\theta$, said velocity function being a calculated angular velocity that monotonically decreases as $\theta_e$ decreases, and is equal to zero when $\theta_e=0$;
C) calculating a regulating current $I_r$ which, when applied to the motor, will cause $\dot{\theta}$ to approach and then remain equal to $f(\theta_e)$;
D) calculating a power that will be consumed by the motor when current $I_r$ is applied to the motor;
E) calculating a saturation current $I_s$, the saturation current being a maximum current that can be applied to the motor without exceeding a specified current or power limitation of the system;
F) if $|I_r|$ is less than $|I_s|$, applying $I_r$ to the motor, otherwise applying $I_s$ to the motor; and
G) repeating steps A) through F) until $\theta=\theta_c$.

17. The computer program product according to claim 16, further comprising a deceleration function that, when executed, generates a non-linear output that, when applied to the motor, provides a desired deceleration response.

18. The computer program product according to claim 16, wherein the process further comprises instructing a second motor to rotate a second assembly of wedge prisms, the first and second assemblies of wedge prisms being rotatable about a common axis, said process further comprising:

I) accepting a desired pointing direction;

II) calculating respective first and second commanded orientations $\theta_{c1}$ and $\theta_{c2}$ of the first and second assemblies of wedge prisms to cause the Risley pointing assembly to point in the desired pointing direction; and III) assigning to the first motor a maximum power draw $Pmax_1$, and assigning to the second motor a maximum power draw $P_{max2}$, where the sum of $Pmax_1$ and $Pmax_2$ is equal to the specified power limitation of the system.

19. The computer program according to claim 18, wherein the process further comprises instructing the first and second motors to rotate the respective first and second assemblies of wedge prisms from their initial angular orientations to their commanded final angular orientations by:

IV) concurrently, for each of the first and second motors and corresponding rotatable elements, indexed by an integer i=1 to N:

A) determining an orientation $\theta$ and a rotational velocity $\dot\theta$ of the rotatable element;

B) calculating a velocity function $f(\theta_e)$, where $\theta_e=\theta_c-\theta$, said velocity function being a calculated angular velocity that monotonically decreases as $\theta_e$ decreases, and is equal to zero when $\theta_e=0$;

C) calculating a regulating current $I_r$ which, when applied to the motor, will cause $\dot\theta$ to approach and then remain equal to $f(\theta_e)$;

D) calculating a power that will be consumed by the motor when current $I_r$ is applied to the motor;

E) calculating a saturation current $I_s$, the saturation current being a maximum current that can be applied to the motor without exceeding $P_{maxi}$; and F) if $|I_r|$ is less than $|I_s|$, applying $I_r$ to the motor, otherwise applying $I_s$ to the motor; and V) repeating steps III) and IV) until $\theta_i=\theta_{ci}$ for all of the rotatable elements.

20. The computer program product according to claim 16, wherein a transition from acceleration to deceleration of the first assembly of wedge prisms occurs when the angular velocity $\dot\theta$ first becomes equal to $f(\theta_e)$.

* * * * *